US009588663B2

United States Patent
Abbas et al.

(10) Patent No.: US 9,588,663 B2
(45) Date of Patent: Mar. 7, 2017

(54) SYSTEM AND METHOD FOR INTEGRATING INTERACTIVE CALL-TO-ACTION, CONTEXTUAL APPLICATIONS WITH VIDEOS

(71) Applicant: 2Cimple, Inc., Plano, TX (US)

(72) Inventors: Syed Athar Abbas, Plano, TX (US); Mubashir Ahmad, Plano, TX (US); Muhammad Rais-ul-Rehman Ali, Karachi (PK); Ali Mohiuddin, Karachi (PK); Sridhar Sanapala, Dallas, TX (US); Farrukh Ismail, Karachi (PK); Usman Haroon, Karachi (PK); Ata Kirmani, Karachi (PK)

(73) Assignee: 2Cimple, Inc., Plano, TX (US)

( * ) Notice: Subject to any disclaimer, the term of this patent is extended or adjusted under 35 U.S.C. 154(b) by 0 days.

(21) Appl. No.: 14/483,885

(22) Filed: Sep. 11, 2014

(65) Prior Publication Data

US 2015/0033127 A1    Jan. 29, 2015

Related U.S. Application Data

(63) Continuation of application No. 12/552,146, filed on Sep. 1, 2009, now abandoned.

(51) Int. Cl.
| | |
|---|---|
| H04N 5/92 | (2006.01) |
| G06F 3/0484 | (2013.01) |
| G11B 27/034 | (2006.01) |
| G11B 27/34 | (2006.01) |
| H04N 21/2343 | (2011.01) |
| H04N 21/44 | (2011.01) |
| H04N 21/4725 | (2011.01) |
| H04N 21/858 | (2011.01) |
| G06F 3/0481 | (2013.01) |

(52) U.S. Cl.
CPC ........ *G06F 3/04842* (2013.01); *G06F 3/0481* (2013.01); *G11B 27/034* (2013.01); *G11B 27/34* (2013.01); *H04N 21/234318* (2013.01); *H04N 21/44012* (2013.01); *H04N 21/4725* (2013.01); *H04N 21/8583* (2013.01)

(58) Field of Classification Search
CPC ... G11B 27/034; G11B 27/34; G06F 3/04842; G06F 3/0481; H04N 21/234318; H04N 21/4725; H04N 21/8583; H04N 21/44012
USPC .................................... 715/719; 386/240
See application file for complete search history.

(56) References Cited

U.S. PATENT DOCUMENTS

| | | | |
|---|---|---|---|
| 6,154,771 A | 11/2000 | Rangan et al. | |
| 6,496,981 B1 * | 12/2002 | Wistendahl | G11B 27/034 345/619 |
| 7,577,978 B1 | 8/2009 | Wistendahl et al. | |
| 2002/0080165 A1 * | 6/2002 | Wakefield | G06Q 30/02 715/738 |
| 2002/0087969 A1 * | 7/2002 | Brunheroto | H04H 20/38 725/13 |

(Continued)

*Primary Examiner* — William Tran
(74) *Attorney, Agent, or Firm* — Haynes and Boone, LLP

(57) ABSTRACT

A system and method of delivering an interactive video application includes identifying a hotspot in a portion of a video content. A hypercode object is overlaid on the hotspot at a spatial point. The hypercode object is displayed at a temporal point during playback of the video content. An interactive application is provided to a viewer of the video in response to activation of the hypercode object.

20 Claims, 12 Drawing Sheets

(56) References Cited

U.S. PATENT DOCUMENTS

| | | | |
|---|---|---|---|
| 2003/0152366 A1* | 8/2003 | Kanazawa | G11B 27/34 386/240 |
| 2005/0132420 A1* | 6/2005 | Howard | G06F 3/017 725/135 |
| 2006/0037044 A1 | 2/2006 | Daniels | |
| 2006/0242574 A1 | 10/2006 | Richardson et al. | |
| 2007/0239546 A1* | 10/2007 | Blum | G06Q 30/02 705/14.47 |
| 2007/0250901 A1* | 10/2007 | McIntire | H04N 7/17318 725/146 |
| 2008/0077952 A1 | 3/2008 | St. Jean et al. | |
| 2008/0288983 A1* | 11/2008 | Johnson | G06Q 30/02 725/46 |
| 2009/0276805 A1* | 11/2009 | Andrews, II | G06Q 30/02 725/35 |
| 2010/0153831 A1* | 6/2010 | Beaton | G06Q 30/02 715/201 |
| 2010/0278453 A1 | 11/2010 | King | |
| 2011/0055713 A1 | 3/2011 | Gruenewald et al. | |
| 2011/0217022 A1 | 9/2011 | Miller et al. | |

* cited by examiner

SYSTEM AND METHOD FOR INTEGRATING INTERACTIVE CALL-TO-ACTION, CONTEXTUAL APPLICATIONS WITH VIDEOS

CROSS-REFERENCE TO RELATED APPLICATION

This application is a continuation of U.S. application Ser. No. 12/552,146, filed Sep. 1, 2009, by inventors Syed Athar Abbas et al., entitled "System and Method for Integrating Interactive Call-To-Action, Contextual Applications with Videos", which is herein incorporated by reference in its entirety.

BACKGROUND

Many people are now familiar with using the World Wide Web and other hyperlink-based communication systems. The World Wide Web has traditionally been a primarily text-based communication medium with a relatively high level of engagement and interaction with media viewers. Television, on the other hand, is a highly visual, primarily video-based communication medium, but is generally passive and not as interactive with media viewers. The present disclosure relates in general to interactive video applications, and in particular to a system and method for integrating interactive call-to-action, contextual application with videos.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion. Furthermore, all features may not be shown in all drawings for simplicity.

DETAILED DESCRIPTION

The present disclosure relates generally to interactive video applications. It is understood that the following disclosure provides many different embodiments, or examples, for implementing different features of the invention. Specific examples of components and arrangements are described below to simplify the present disclosure. These are, of course, merely examples and are not intended to be limiting.

Figure 1:
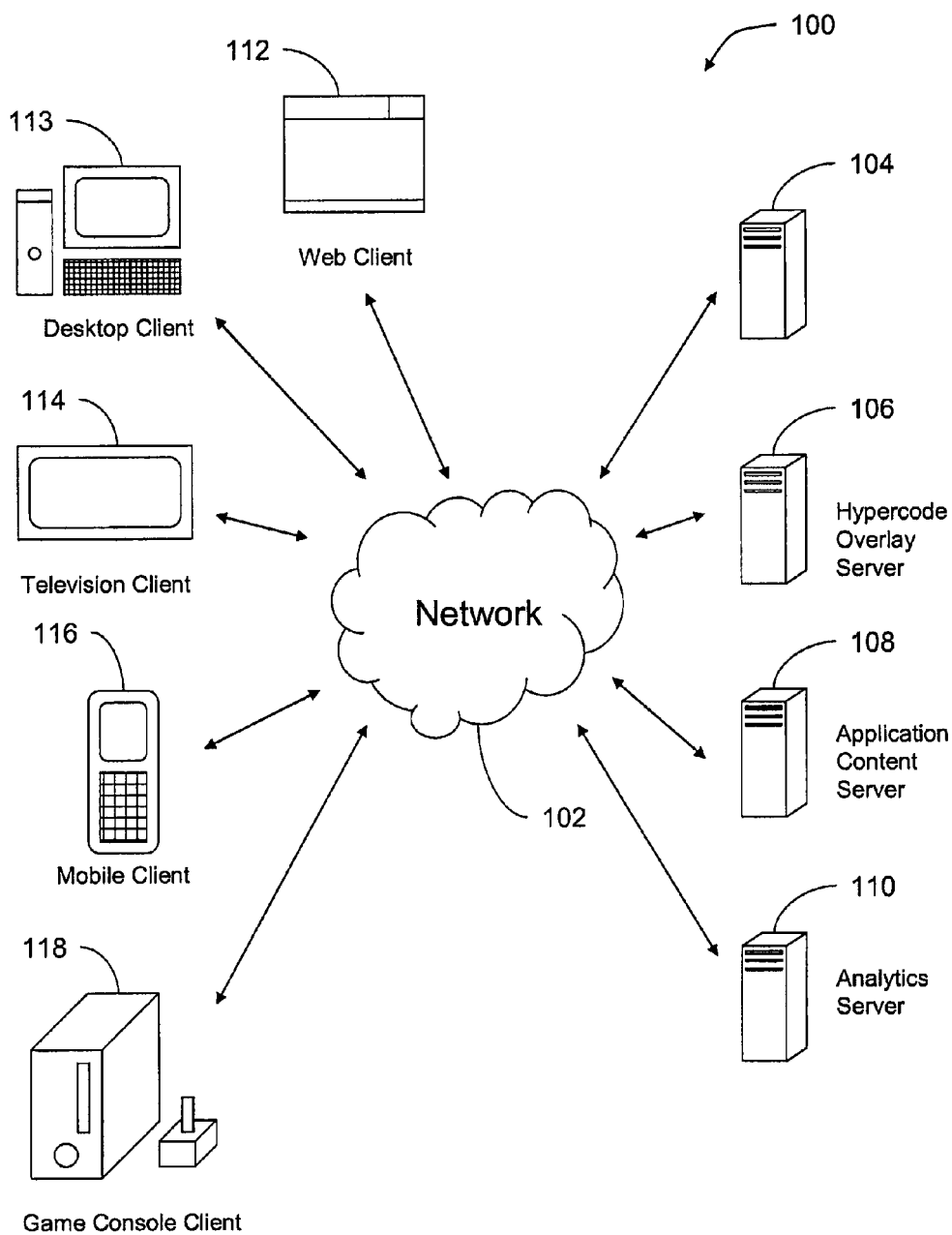
FIG. 1 is a diagrammatic illustration of a system for managing and delivering interactive video applications according to an exemplary embodiment.

Referring to FIG. 1, illustrated is a system 100 for delivering interactive video applications. The system 100 includes a network 102, which is preferably the Internet but may be a private intranet, a local area network (LAN), a wide area network (WAN), an adhoc network, cellular network including CDMA, GSM, and UMTS, a cable network, DSL network, fiber network, WiMAX network, or a combination of some or all of these networks, or any other suitable network. Communicating with and over the network 102 are a variety of servers and clients. The servers include a video server 104, a hypercode overlay server 106, an application server 108, and an analytics server 110. Each of these servers may be implemented using hardware, software, or a combination of the two. The servers 104-110 may be separate from one another, or some or all of them may share computing resources such as data storage, network access, processing resources, memory, operating systems, software libraries, and the like. The servers may be controlled by one entity, or they may be under the control of separate entities. For example, the video server 104 may be controlled by a media company, the hypercode overlay server 106 and the application server 108 may be controlled by a separate marketing company, and the analytics server 110 may be controlled by a third company.

In an exemplary embodiment, during the operation of the system 100, video publishers identify application hotspots within a video stored on the video server 104. Hotspots are spatial and temporal locations within a video that are deemed important. Importance can be based on a key aspect of the video, a particular point in time in the video, or an arbitrary point in the video. Contextually relevant applications are then associated with each of the hotspots by hypercode stored on the hypercode overlay server 106. In one embodiment, sponsors are made aware of the application hotspots and then buy or bid on contextually relevant call-to-action interactive applications to be associated with the video. These applications are stored on the application server 108, and are embedded (at the hotspots) through the use of hypercode within the video stored on the video server 104. The hypercoding process includes (i) the process of incorporating hypercode objects on a virtual timeline that is linked to a video player or certain objects/areas within the video and (ii) the process of incorporating one or more hypercode objects while the video player is playing the video and executing the actions specified by the one or more hypercode objects.

A video server 104 provides video content to the video player and other parts of the system. The video server 104 may include multiple servers that provide redundant serving capacity for video content, and a server may be selected to provide video content to a particular viewer based on the geographic location of the user. In this way, the server that is logically or physically nearest to the viewer can deliver the requested video content. The video content may be provided by hypertext transfer protocol (HTTP), real-time transport protocol (RTP), real time messaging protocol (RTMP), or any other suitable protocol.

Viewers interact with the video via the interactive applications in order to obtain more information, receive associated services, make a purchase, etc. These applications can be activated based on time, user interaction, or some other event. For example, the viewer can mouse over a hypercode object and be presented with a menu of applications, such as product info (type, available colors, prices, etc.), retail location search, click-to-call, coupons, etc. As an example, when the video player and the video are loaded, initially the applications embedded in the video player skin and video stream are sponsored by a first sponsor for the first few minutes. The first sponsor's applications may include a custom video player skin, a click-to-call application, a retailer location search, a coupon printer, etc. After the first few minutes, a second sponsor sponsors the applications in the video player and in the video stream, such that the video player has a different skin, a different click-to-call application, a second retailer location search, new coupons, etc. In another example, applications appear at certain intervals throughout the video and are sponsored by different sponsors.

The analytics server 110 performs tracking of viewer interaction with the embedded applications. The tracking data may be used by publishers and sponsors for business intelligence and financial analysis purposes, and to improve the application delivery.

Also communicating with and over the network 102 are a variety of clients including a web client 112, a television client 114, a mobile client 116, and a game console client 118. The web client 112 may be web browser software executing on a personal computer, for example Microsoft Internet Explorer, Google Chrome, Mozilla Firefox, Apple Safari, or any other suitable web client. The television client 114 may be a television, set-top box, cable converter, digital video recorder, or any other suitable television client. The mobile client 116 may be a personal data assistant, mobile phone, smart phone, portable media player, MP3 player, automobile, wearable computer, or other suitable mobile client. The game console 118 may be a video game console, such as a Microsoft Xbox 360, Sony PlayStation 3, Nintendo Wii, or any other suitable game console or platform.

In the system 100, each of the clients 112-118 communicates with one or more of the servers 104-110. As one example, the web client 112 may request interactive content from the application server 108. In response, the application server 108 directs the web client 112 to request a video from the video server 104 and a hypercode overlay from the hypercode server 106 and attach applications from the applications server 108. The web client 112 subsequently reports information on a viewer's interaction with the received video, hypercode objects, and triggered applications to the analytics server 110. Of course it is understood that any of the other clients 114-118 could also be used to access the same or similar content instead of or in addition to the web client 112.

Figure 2:
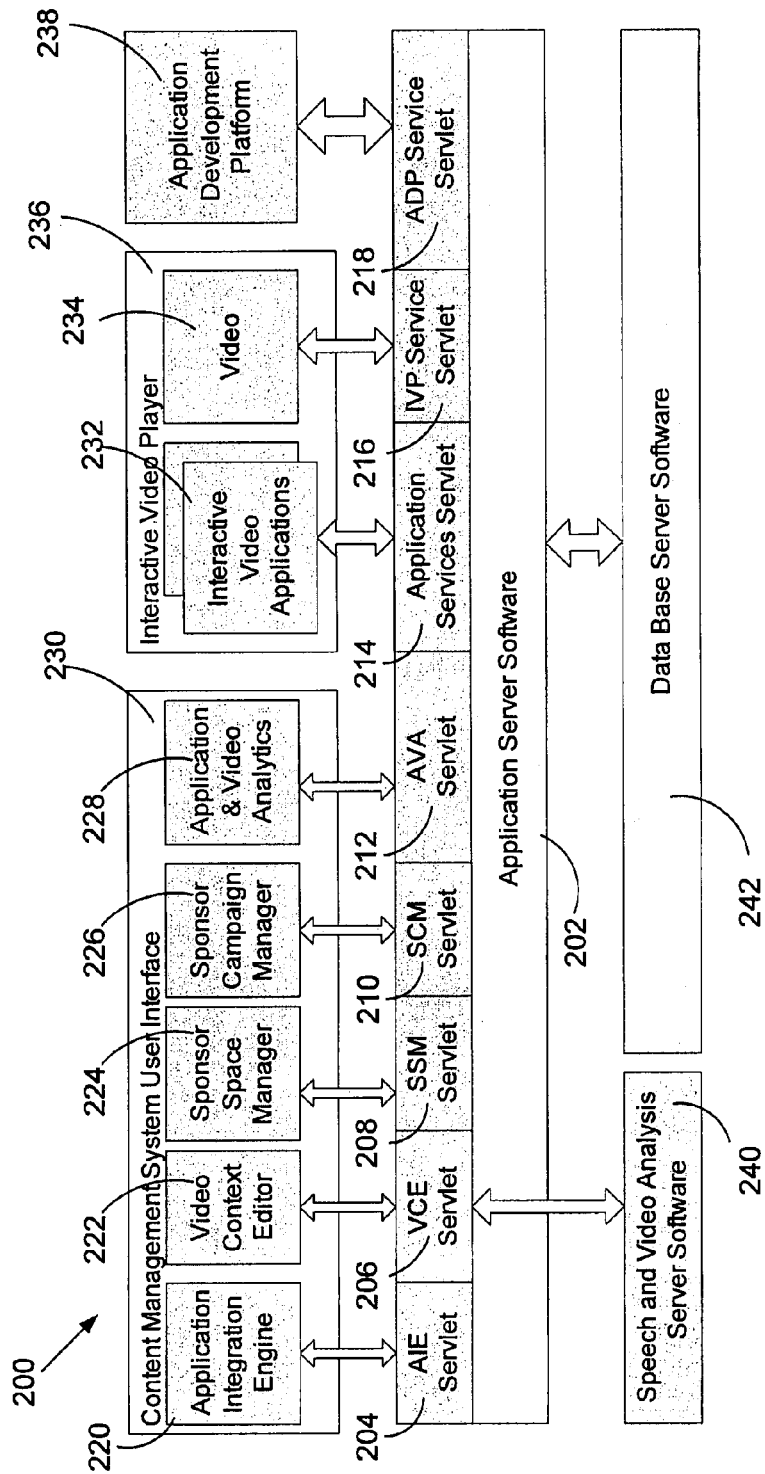
FIG. 2 is a diagrammatic illustration of a software architecture for operating the system of FIG. 1 for managing and delivering interactive video applications according to an exemplary embodiment.

FIG. 2 illustrates an exemplary embodiment of a software architecture 200 used with the system 100 to manage and deliver interactive video applications. As the focus of FIG. 2 is on the software architecture and not on the hardware architecture, each of the part of the architecture 200 may be stored and/or executed on one or more of the above-described components of the system 100. In several exemplary embodiments, instead of, or in addition to being stored and/or executed on one or more of the system 100, each of the parts of the described architecture 200 may execute on one computer or on multiple computers, and it is understood that the various parts of the architecture 200 may execute on different computers, and that the computers may implement some parts while not implementing others.

The software architecture 200 includes application server software 202. In an exemplary embodiment, the application server software 202 is java application software, although a non-java application server software could also be used. The application server software 202 is operably coupled to database software 242. The application server software 202 supports various server processes or "servlets," including an application integration engine (AIE) servlet 204, a video context editor (VCE) servlet 206, a sponsor space manager (SSM) servlet 208, a sponsor campaign manager (SCM) servlet 210, an application & video analytics (AVA) servlet 212, an application services servlet 214, an interactive video player (IVP) service servlet 216, and an application development platform (ADP) service servlet 218.

Some or all of the servlets 204-218 may rely on services provided by one another, and thus they may communicate with each other either directly or indirectly through the application server 204. The various servlets 204-218 may store their associated data in one database, or they may store data in multiple databases, which may be shared or not shared among and between the servlets. Some servlets may access or store data in multiple databases.

The application integration engine servlet 204 is operably coupled to and responds to requests from an application integration engine 220 for customizing a video player and linking applications with hotspots in a video using hypercode objects. The application integration engine servlet 204 is operably coupled to and responds to requests from the application integration engine 220 for defining the properties of hotspots related to applications in a video. The video context editor servlet 206 is operably coupled to and responds to requests from a video context editor 222 for defining the context and location of hotspots in a video. The video context editor servlet 206 is also operably coupled to speech and video analysis server software 240. The sponsor space manager servlet 208 is operably coupled to and responds to requests from a sponsor space manager 224 for placing hotspots and appropriate applications in videos up for purchase or bid by sponsors. The sponsor campaign manager servlet 210 is operably coupled to and responds to requests from the sponsor campaign manager 226 for managing the creation and oversight of sponsor's campaigns.

The application & video analytics servlet 212 is operably coupled to and responds to requests from an application & video analytics 228 for counting the number of times videos and applications have been viewed or delivered to viewers, as well as analyzing the different types of interactions with videos and applications by viewers. The application & video analytics servlet 212 may also perform analysis on viewer interaction data to produce charts and tables to be made available to publishers and sponsors. In one embodiment, application & video analytics servlet 212 records viewer interactions with a video to analytics server 110 using database server software 242. In one embodiment, application & video analytics servlet 212 records the location of the viewer, originating link for the video, the most popular and least popular sections of the video, etc.

The application services servlet 214 is operably coupled to an interactive video player 236 and allows publishers and sponsors to serve interactive applications to a viewer. The interactive video player service servlet 216 is operably coupled to the interactive video player 236 and allows publishers and sponsors to serve video to a viewer. The interactive video player service servlet 216 is a server process that runs on hypercode overlay server 106.

The application development platform service servlet 218 is operably coupled to and responds to requests from an application development platform 238 for creating and customize new applications using widget blocks.

A content management system user interface 230 contains a graphical user interface that acts as the main console for publishers and sponsors to manage the content of the video and the applications. The content management system user interface 230 may also be used by administrators, publishers and sponsors. This content management system user interface 230 is operably coupled to the application integration engine 220, the video context editor 222, the sponsor space manager 224, the sponsor campaign manager 226, and the application & video analytics 228.

The application integration engine 220 served by the application integration engine servlet 204 allows the video content owner or the publisher to embed interactive applications at application hotspots defined by the video context editor 222 served by the video context editor servlet 206. The applications employed by the application integration engine 220 are stored on the application server 108. The content owner or the publisher uses the application integration engine 220 to embed applications in the video by defining various types of hotspots at certain positions and times within the video stream using hypercode objects.

In one embodiment, the application integration engine 200 links applications at the hotspots by non-intrusive hypercode objects within the video. A hypercode object is a passive software marker, usually invisible to the viewer, that is linked to a video player skin or video stream. A virtual timeline is a schedule of hypercode objects linked to a video. The virtual timeline is activated when the video player starts the video playback. The video player reads the virtual timeline, and takes the appropriate action based on the applicable scheduling of the hypercode objects in the virtual timeline. In one embodiment, a hypercode object becomes visible when a viewer moves a mouse cursor over the hypercode object. Hypercode objects have a variety of properties, such as time, duration, x-axis position, y-axis position, size, action, and type. The time and duration properties indicate the activation time and duration of the hypercode object along the virtual timeline. The x-axis position of the video, y-axis position and size properties are used to determine the spatial point and size of the hypercode object on the video stream. The action property indicates the action to taken by the video player. In an exemplary embodiment, hypercode objects are saved to a XML file, although the hypercode objects could also be saved to any suitable file format. Various examples of hypercode objects XML files are provided in appendices at the end of this disclosure. The examples show various features and properties that are available for the hypercode objects, including id, size, time, duration, and action. The type property identifies the type of hypercode object. One type of hypercode object is an audio hypercode object, which plays audio files associated with it. In one embodiment, viewers can distinguish audio hypercode objects by rolling a mouse pointer over it, causing a distinguishing audio icon to appear. In one embodiment, an audio application will be executed by an audio hypercode object when the viewer moves a mouse pointer over the audio hypercode object, and execution will cease when the viewer moves the mouse pointer away from the audio hypercode object. Another type of hypercode object is an image hypercode object, which may be displayed in an image banner. The viewer clicks on the image hypercode object to execute an interactive application, which, in one embodiment, links to a specific uniform resource locator. In one embodiment, the image hypercode object contains files in the jpeg, png or gif file formats. Another type of hypercode object is a text hypercode object. In one embodiment, text is added to a text hypercode object using hypertext markup language. Another type of hypercode object is a video hypercode object. In one embodiment, viewer interaction with a video hypercode object executes an application that plays another video within the video containing the video hypercode object.

The interactive video player 236 displays hypercode objects of the following shapes: circle, rectangle, round rectangle, dotted rectangle, dashed rectangle, and irregular. In an exemplary embodiment, other shapes could be used. In one embodiment, to display a hypercode object of irregular shape, the video player receives a series of XML point instructions that are used to draw the irregular shape. Hypercode objects may by animated in a linear, curving, or multiple curving direction to track moving graphical objects in a video. Hypercode objects are added to a video player skin or certain graphical objects or certain areas of a video stream. Adding these hypercode objects causes the video player skin and the areas and object to become interactive. When viewers provide input to a hypercode object via the video player skin or video stream, the application linked with the hypercode object is invoked. The hypercoding process enables the deployment of applications temporally and spatially in video stream. In one embodiment, a sponsor buys customized applications linked with embedded hypercode objects. After a video is published to the public, multiple viewers viewing the video click on the embedded hypercode objects to be redirected to a sponsor's landing page or otherwise receive additional information from the sponsor through applications. Typically, hypercode objects do not activate applications unless and until a viewer interacts with them via a mouse-over or mouse-click. However, hypercode objects can invoke applications based on certain time intervals or certain events, without direct input from the viewer. In one embodiment, activation of an application associated with a hypercode object occurs at a particular time in the video.

Figure 3A:
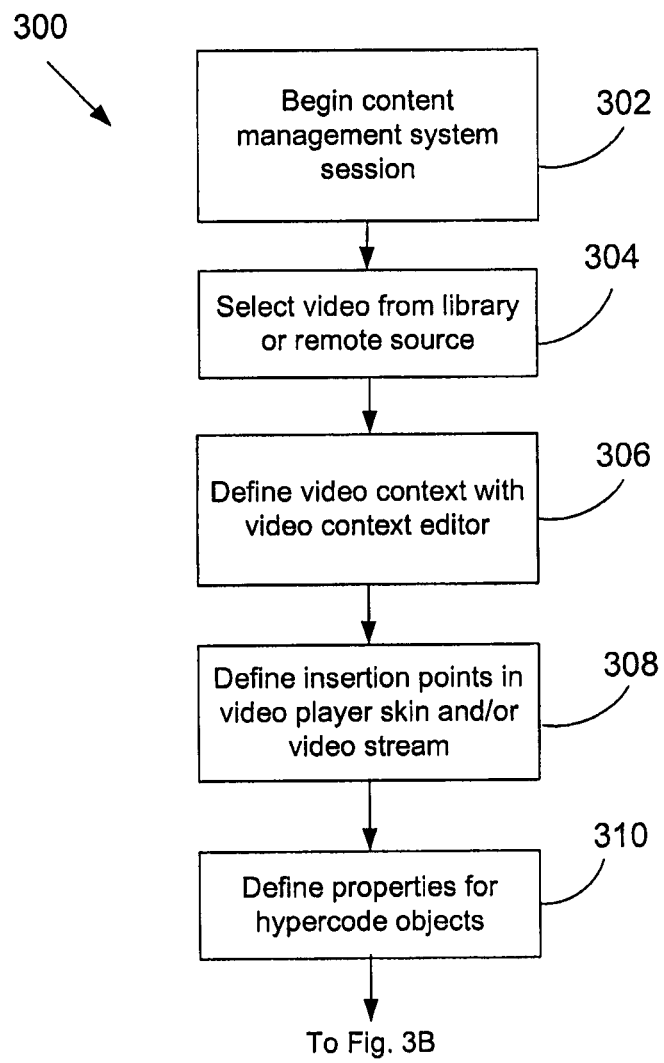
FIGS. 3A and 3B are flow chart illustrations of a method for managing and delivering interactive video applications using the system of FIG. 1 and the software architecture of FIG. 2 according to an exemplary embodiment.
Figure 3B:
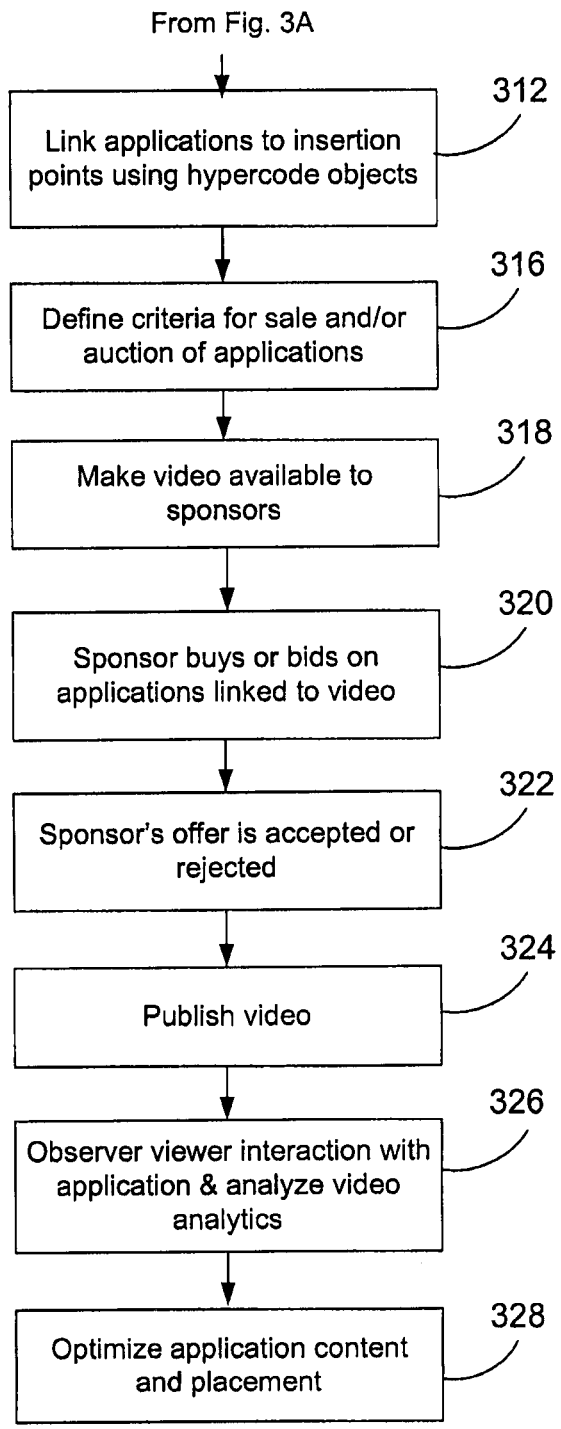

In an exemplary embodiment, as illustrated in FIGS. 3A and 3B, a method of operating the system 100 using the software architecture 200 is generally referred to by the reference numeral 300 and includes a step 302, which includes beginning a content management system session using the content management system 230. A step 304 includes selecting a video from a library or remote source. In one embodiment, to execute the step 304, a publisher uploads the video from a remote source to the video server 104. In another embodiment, to execute the step 304, the publisher selects video from a library or video stored on video server 104. At a step 306, the publisher defines the context of the video using the video context editor 222. In an exemplary embodiment, contextual information is defined manually, without computer assistance. In the manual case, the publisher enters information about the video, such as an overall topical category (e.g. sport or news) and individual topical categories, time codes, and durations for each scene in the video. In the computer assisted case, contextual information is added through a set of automatic processes that do not require any input from the publisher. In one embodiment, this process requires the speech and video analysis server software 240 to be linked to an object signature database and a speech or word signature database. In the computer assisted case, the video context editor 222 differentiates the scenes of the video by computing and comparing a frame to frame histogram. This process generates contextual information for each scene and attaches the information to a video context file.

At a step 308, using the video context editor 222, the publisher identifies hotspots within the video and video player skin. At a step 310, using the application integration engine 220, the publisher defines properties for hypercode objects embedded at the hotspots, either manually or with computer assistance, or both. In the manual case, the publisher selects the desired properties for the embedded hypercode object (e.g. shape, text, audio, time code, duration, x and y coordinates, trigger event). In the computer-assisted case, an automatic process identifies the graphical object present in each scene, and generate a signature for each graphical object to compare it with graphical object signature in an graphical object signature database. If a match is found, the graphical object in the database is linked to a scene record. In one embodiment, graphical object locations are tracked in a scene and changes in location are recorded and saved for use by applications. The automatic process uses speech recognition and pattern recognition technology to identify the words spoken in the scene and graphical objects in a scene using the speech and video analysis server software 240 and link these works with the scene record. After analyzing the graphical objects and speech in the scene, the automatic processes will generate results for the publisher to accept or correct.

As shown in FIG. 3B, the method 300 of operating the system 100 using the software architecture 200 also includes a step 312, during which the publisher links applications to the video at the hotspots with hypercode objects using the application integration engine 220. In one embodiment, the step 312 also includes the publisher selecting an appropriate video player template based on the video context.

At a step 316, the publisher defines criteria for sale and/or auction of applications. In an exemplary embodiment, the definition is done through sponsor space manager 224. At a step 318, the publisher makes the video available to potential sponsors. At a step 320, sponsors buy or bid on applications attached to the hypercode objects. In an exemplary embodiment, this is done using the sponsor campaign manager 226. Also in the step 320, sponsors may customize the applications they buy (e.g. by inserting logos, phone numbers, etc.). In one embodiment, the sponsor customizes the application to appear at certain times of the day or to visitor from certain geographic locations or to visitors matching a certain demographic profile.

At a step 322, the sponsor's offer is accepted or rejected by the publisher. In the step 322, the publisher reviews and chooses whether or not to approve the sponsor's bid and/or customization of the applications. In an exemplary embodiment, this approval is done through the sponsor space manager 224. At a step 324, the video is published to the public. At a step 326, viewer interaction with the applications embedded in the video is tracked and analyzed using the application & video analytics 228. In the step 326, the viewer plays the video using the interactive video player 236. When the video is played, the applicable applications will be accessible through hypercode objects at appropriate points and times within the video or on the player skin, as defined in the earlier steps. In a step 328, the applications are optimized, edited and repositioned according to the tracking data obtained in the step 326. In an exemplary embodiment, optimization of the applications includes repeating one or more of the steps in FIGS. 3A and 3B.

Figure 4:
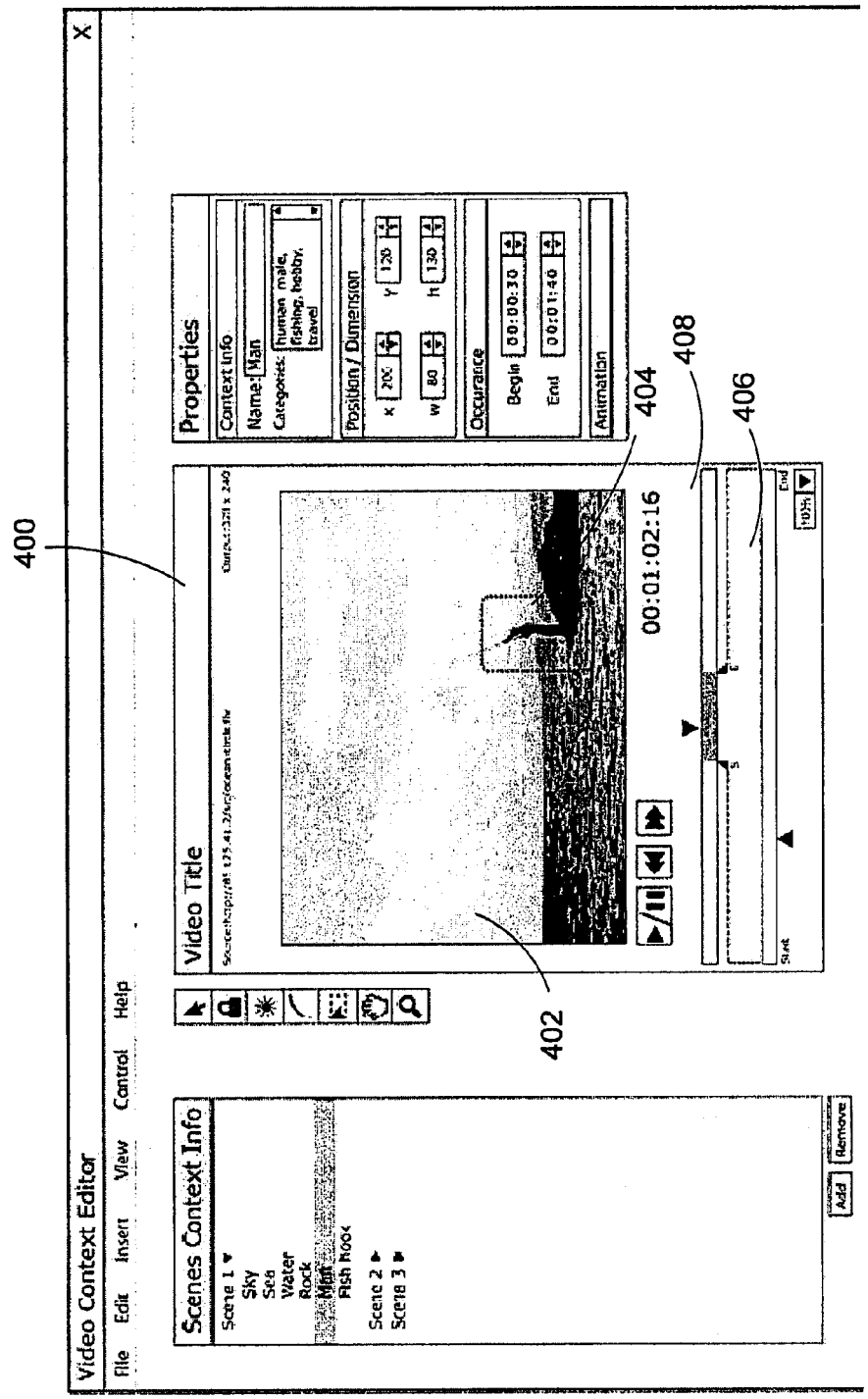
FIG. 4 illustrates a user interface for defining the context and properties of videos used to deliver interactive video applications according to an exemplary embodiment.

Turning now to FIG. 4, illustrated is a user interface for the video context editor 222. The video context editor 222 allows the video owner or the publisher to define contextual information about the video by associating tags with certain times during the video and/or with certain areas within the video in the step 306. Video context editor 222 then uses these tags to help identify application hotspots. In one embodiment, the contextual information is kept in a database separate from the video. The video context editor 222 includes a video editing window 400 showing a video 402. Within the video 402 is a hotspot 404 indicated by a dotted outline. The hotspot 404 has the shape of a rounded rectangle, although other shapes are also possible, including squares, rectangles, circles, triangles, stars, ovals, trapezoids, parallelograms, pentagons, octagons, sectors, irregular shapes, and any other shape. Instead of a dotted outline, the hotspot 404 could also be indicated by varying the shading or lighting of the underlying video, such as to create a bubble-effect, lighted sphere appearance, dimming effect, or glowing effect.

The video editing window 400 also includes a virtual timeline 406 corresponding to the playback timeline for the video 402. Just above the virtual timeline 406 is a hotspot timeline 408 indicating a start time when the hotspot 404 will begin being displayed and an end time when the hotspot 404 will cease being displayed. By adjusting the start time and end time, a user of the video context editor 222 can adjust when during playback of the video 402 the hotspot 404 will be available.

Thus, a user can use the video context editor 222 to add a variety of different kinds of the hotspots 404 to the video 402 at the desired hotspots in the step 308. The hotspot 404 can be stationary, or it can move to track movement in the underlying video, such as when an object moves. Thus, the hotspot 404 can change location and shape during the hotspot timeline 408. A user can create multiple hotspots and multiple hotspot timelines. The start time and end time may be the same or different for various hotspots, and thus, more than one hypercode object may be active at any point in the virtual timeline.

In one embodiment, instead of manually specifying a hotspot's location and movement, the video context editor 222 automates the hotspot and hypercode object creation processes via communications with a server. These communications begin with the video context editor 222 sending an object recognition request to the server. The request includes a video, a location, and a time. The video may be provided by reference, such as by providing a URL to the video file, or by sending the video data itself. The location is a location on the video image, and may be a single location, such as a point or pixel, or a range of locations, such as a shape. The time is a time or range of times within the video's virtual timeline. The server analyzes the video at the specified time and in the specified location. Using an object recognition algorithm, the server creates a list of graphical objects shown in the video. The object recognition algorithm may use an open source library, or any other suitable graphical object recognition algorithm.

The server-generated list of graphical objects may contain only one graphical object, or it may contain multiple graphical objects. The server sends the list of graphical objects to the video context editor 222, where the video context editor 222 presents the list of graphical objects to the user. Preferably, the video context editor 222 displays the graphical objects in the list as images taken from the video, but any suitable presentation of the list may be used. The user then selects a graphical object from the list (if there are multiple objects) or confirms the detected graphical object (if there is only one graphical object on the list). The client then sends the user's selection or confirmation to the server.

The server then employs an graphical object tracking algorithm to track the motion of the selected graphical object in the video over the range of times specified in the request. The graphical object tracking algorithm may be supplied by an open source library or by any other suitable graphical object tracking algorithm. The graphical object tracking algorithm generates movement data that describes the movement of the graphical object in the video. The server then sends this movement data back to the video context editor 222, preferably in an XML format, although any suitable file format may be used.

Figure 5:
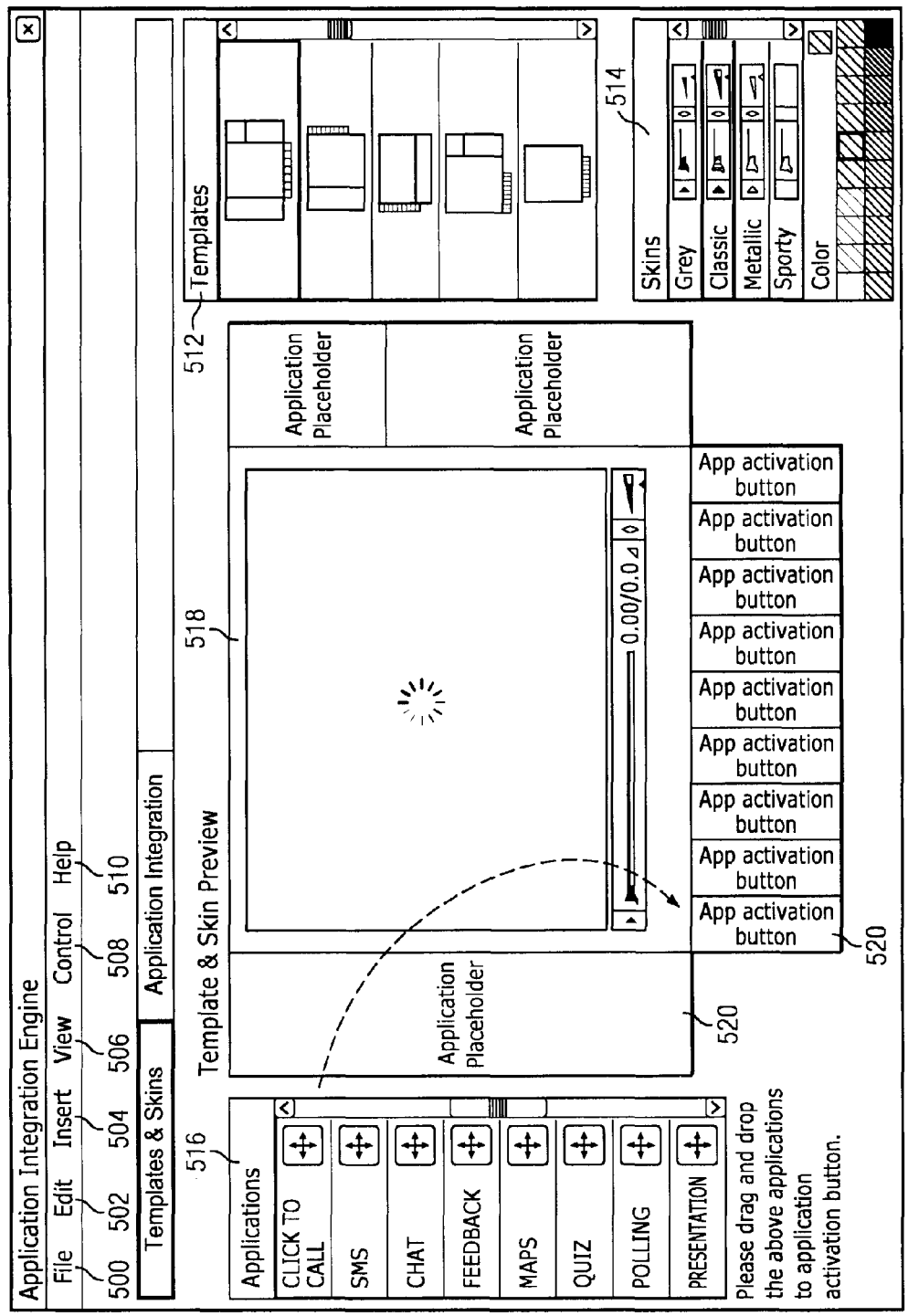
FIG. 5 illustrates a user interface for customizing a video player used to deliver interactive video applications according to an exemplary embodiment.

Turning now to FIG. 5, a file menu 500 of the application integration engine 220 for use in the step 312 that enables publishers to open or close application integration engine sessions, save sessions, preview sessions, and create copies of sessions, according to an exemplary embodiment. The preview session command generates an XML file based on the video player, hypercode objects, and linked applications. This XML file is then sent to the interactive video player 236. The save sessions command generates and saves an XML file of the video player and hypercode objects, allowing the publisher to close the application integration engine session, and open another application integration engine session without loss of data. The edit menu 502 contains traditional cut, copy, and paste commands, as well as commands for selecting hypercode objects, video player templates, and find and search features. In one embodiment, the commands on the edit menu are accessible using input from a keyboard. An insert menu 504 contains a list of various types of hypercode objects, such as video, audio, text and shape. The insert menu 504 also contains commands for insertion of animation and preset transitions. A view menu 506 contains commands for viewing, opening, and navigating toolbars and tabs. The view menu 506 also contains commands for changing the zoom level and changing the application integration engine graphical layout. A control menu 508 contains commands related to the viewing of the video stream, such as play, stop, pause, volume adjust, and quality adjust. A help menu 510 contains commands to access information about and check for updates to the application integration engine software. The help menu 510 also contains commands to access information plug-ins for the software, operating system. The help menu 510 also contains commands to check for software updates, visit a Web Site with information about the software, and to detect problems with and make repairs to the software.

The first application integration engine window is illustrated in FIG. 5, and contains a template layout panel 512 and template skin panel 514, which are used in the step 312 to choose a video player template. In one embodiment, the publisher also allocates appropriate space on the video player for a message, logo, image, etc. In one embodiment, the publisher also defines this space to be a 320 by 80 pixel banner that will slide up from the bottom of the video at 55 second into the video and slide back down after 15 seconds.

The first application integration engine window also contains an applications panel 516, which contains the various applications available to be embedded in the step 312 in the video player skin 518. The publisher links applications from the application panel 516 in the step 312 by dragging the application from the panel 516 and dropping the application on the locations 520. In one embodiment, the applications include applications designed to contact the viewer through SMS, phone call, phone text, email, etc. In one embodiment, the applications include graphics applications such as maps, quizzes, games, etc. When the video is published, the viewer interacts with the applications by rolling a mouse cursor over or clicking on the locations 520 in the video player skin 518.

Figure 6:
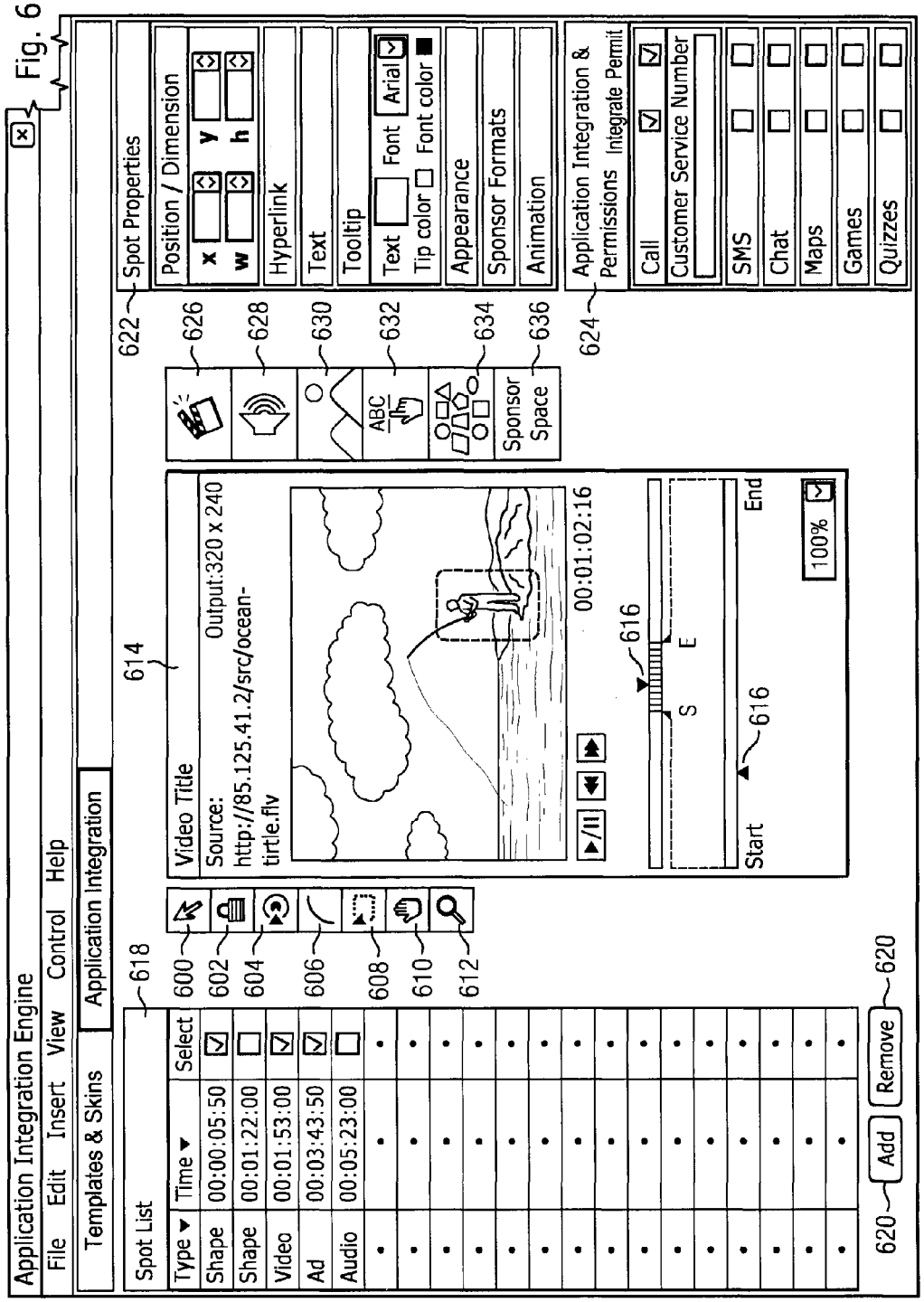
FIG. 6 illustrates a user interface for defining and linking interactive video applications to a video or video player according to an exemplary embodiment.

Turning now to FIG. 6, the second application integration engine window for performing the step 310 is illustrated and contains the move tool 600, which moves selected hypercode object in the video. A lock tool 602 prevents the selection and editing of hypercode objects. An automatic object motion detection tool 604 allows selection of a region of a video, which is then analyzed by a server to generate a list of graphical objects within the region in the same manner as the object recognition system described above in the context of the video context editor 222. One or more of the graphical objects can then be selected for tracking by a hypercode object as the item moves through the video over time.

The animation tool 606 draws a linear or curved motion path and associates the path with a hypercode object. The location of the hypercode object then follows the motion path during video playback. The transformation tool 608 changes the appearance of an item in the video by scaling, rotating, skewing, changing perspectives, distorting, flipping, etc. The hand tool 610 moves the video within the application integration engine window. The magnify tool 612 zooms in or out on the video.

The application integration engine window also contains a video canvas panel 614, which shows the video title, video file path and output size. The video canvas panel contains the commands load video, play video, pause video, show video loading/buffering, zoom in/out on video, show playing time, show time code, and show time range. A change to a hypercode object or to the video can be made by manipulation of sliders 616 at the bottom of the video canvas panel 614.

The application integration engine window also contains a hypercode spot list panel 618. The items on the hypercode spot list panel 618 sort automatically based on staring time. Clicking of an item in the hypercode spot list panel 618 selects a spot on the video and jumps the video to the starting time position associated with the selected item.

The application integration engine window also contain a spot properties panel 622, which is used to perform the step 310. The spot properties panel 622 is used to set the type and properties of hypercode objects. Types of hypercode objects include audio, video, image, geometric or irregular shape, etc. Hypercode objects can be added or removed and their properties set through the spot properties panel 622. Properties are common to all hypercode objects or unique to individual hotspots. For example, a time of occurrence or x and y position may be common to all hypercode objects in the video, while some hypercode objects would be of the audio type, and some would be of the video type. Types of hypercode object properties include: x position, y position, width, height, begin time, end time, rollover text and hyperlink. The position of the hypercode objects is set using the numeric stepper in the spot properties panel 622, while the hyperlink and rollover text can be set using the text box in the spot properties panel 622. To further perform the step 310, hypercode objects can be linked to or removed from the hypercode list panel 618 by clicking the add or remove buttons 620.

The application integration engine window also contains an application panel 624, which contains the various applications available to be embedded in the video at the hotspots in the step 312. The publisher links applications from the application panel in the step 312 by dragging the application from the panel and dropping the application on the hypercode object hotspot. In one embodiment, the applications on the application selection panel include: player branding, click-to-call, mobile coupon, search for store, click to email, landing Web pages, social network integration etc. In one embodiment, the applications include applications designed to contact the viewer through SMS, phone call, phone text, email, etc. In one embodiment, the applications include graphics applications such as maps, quizzes, games, etc. When the video is published, the viewer interacts with the applications by rolling a mouse cursor over or clicking on the hotspots.

The application integration engine window also contains a hypercode type toolbar that provides icons allowing a user to specify as part of the step 312 how a hypercode object will respond to a viewer's activation. The hypercode type toolbar includes an icon 626 for a video hypercode object that will load and play a different video file, which may be another interactive video application. A video hypercode object can also cause a jump to a different location in the virtual timeline within the same video. An icon 628 for an audio hypercode object will load and play an audio file, such as a WAV or MP3 file. An icon 630 for an image hypercode object will display an image, such as a photo or drawing, which may be in GIF, JPG, PNG, or any other suitable image format. An icon 632 for a text hypercode object will display text, which may be hypertext, such as a Web page. The hypercode type toolbar 626 also includes a hotspot shape icon 634 and an sponsor space icon 636.

Figure 7:
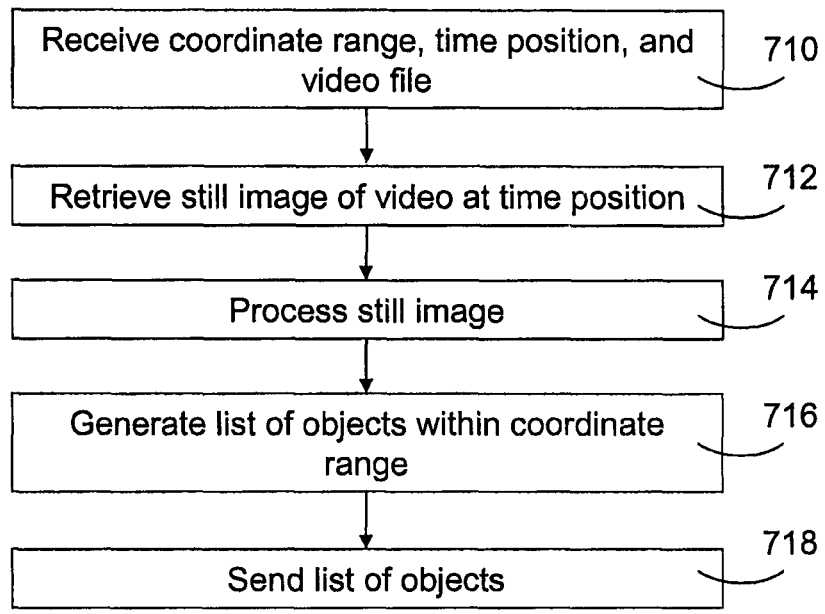
FIG. 7 is a diagrammatic illustration of a method for automatically determining a list of graphical objects in a video according to an exemplary embodiment.

FIG. 7 illustrates a process for determining a list of graphical objects in a video. The process may be used, for instance, as part of the step 312 by the application integration engine 220. The process begins in step 710 with receiving a coordinate range, a time position, and a video file. The coordinate range indicates a selected area of the video image to be analyzed, and the time position indicates the time during the video's timeline at which the video image is to be analyzed. The video file can be in any suitable video format, including MPEG, H.264, AVI, Quicktime, Flash Video, Windows Media Player. Next at step 712, the still image of the video at the time position is retrieved. Then in step 714, the still image is processed. The processing may depend on the original video format and may include, for example, cropping the still image to the received coordinate range. Next in step 716 a list of graphical objects within the coordinate range of the still image is generated. Then in step 718 the list of graphical objects is sent out.

Figure 8:
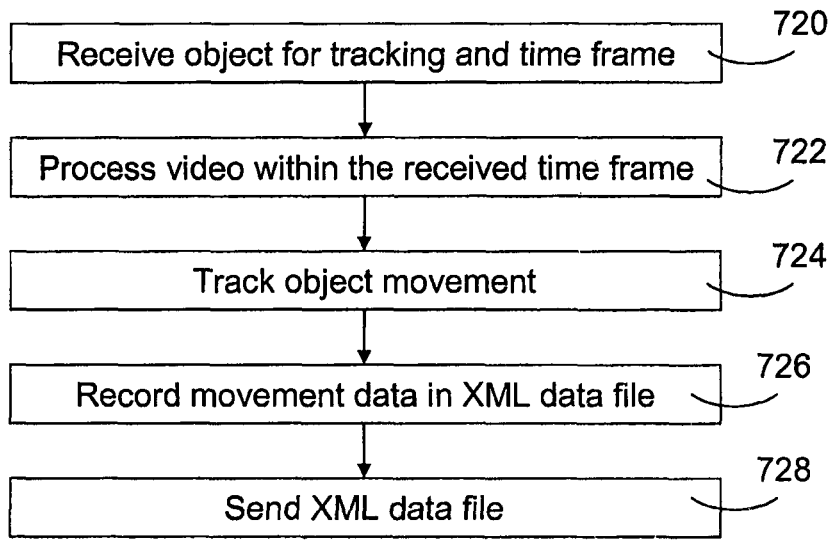
FIG. 8 is a diagrammatic illustration of a method for automatically generating tracking data for a graphical object in a video according to an exemplary embodiment.

FIG. 8 illustrates a process for generating tracking data for a graphical object in a video as part on the step 312. The process begins at step 720 with receiving a graphical object to be tracked and a time frame. In step 722, the video is processed over the length of the received time frame and at each frame the location of the object is determined. Then in step 724, the graphical object's movement across the frames is tracked. In step 726, the movement data from step 722 is written to a file, such as an XML file. Finally in step 728, the data file is sent out. A user can then use the movement data to create a hypercode object that will track the movement of the graphical object with a hotspot. This automated system for creating a hypercode object greatly reduces the amount of time and human effort required to create hotspots in videos and accelerates the process of creating interactive video applications. The movement data remains editable; the user can adjust the hotspot movement if necessary.

Figure 9:
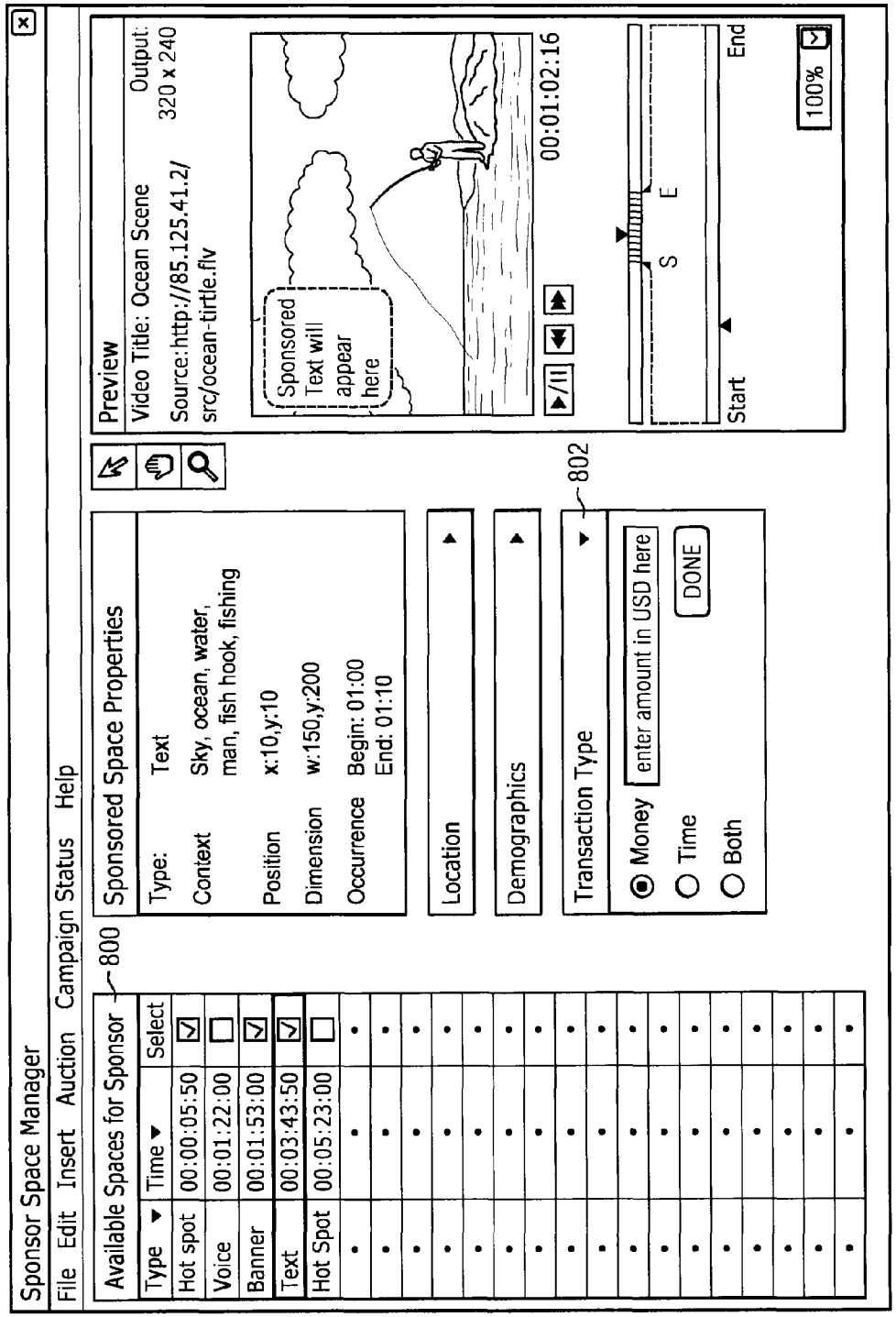
FIG. 9 illustrates a user interface for managing a system of presenting interactive video applications to sponsors according to an exemplary embodiment.

Turning now to FIG. 9, illustrated is a user interface for the sponsor space manager 224. As described above, the content management system software 230 (FIG. 2) includes a sponsor space manager 224 that allows a publisher to define details for each application that is linked to a hotspot within the video by the application integration engine 220. The sponsor space manager 224 is served by the sponsor space manager servlet 210 as part of the application software 202 on the application server 108. As shown in FIG. 9, the sponsor space manager 224 includes an available spaces panel 800. The available spaces panel 800 is used by the publisher to view and manage the information about applications to be embedded in a given video. In an exemplary embodiment, the publisher uses available spaces panel 800 to disseminate information about applications for the video player skin, as well as the hotspots in the video stream. The sponsor space manager 224 also includes transaction type panel 802. The publisher uses transaction type panel 802 at the step 316, to identify prices, duration, discounts for each application linked to hypercode object related to the video. In another embodiment, the publisher can put the applications linked to hypercode objects up for bid by sponsors. In another embodiment, the publisher can use an external video ad network to place applications into the hotspots. In yet another embodiment, the publisher uses the sponsor space manager 224 to view analytical data regarding viewer interaction with the placed content.

Figure 10:
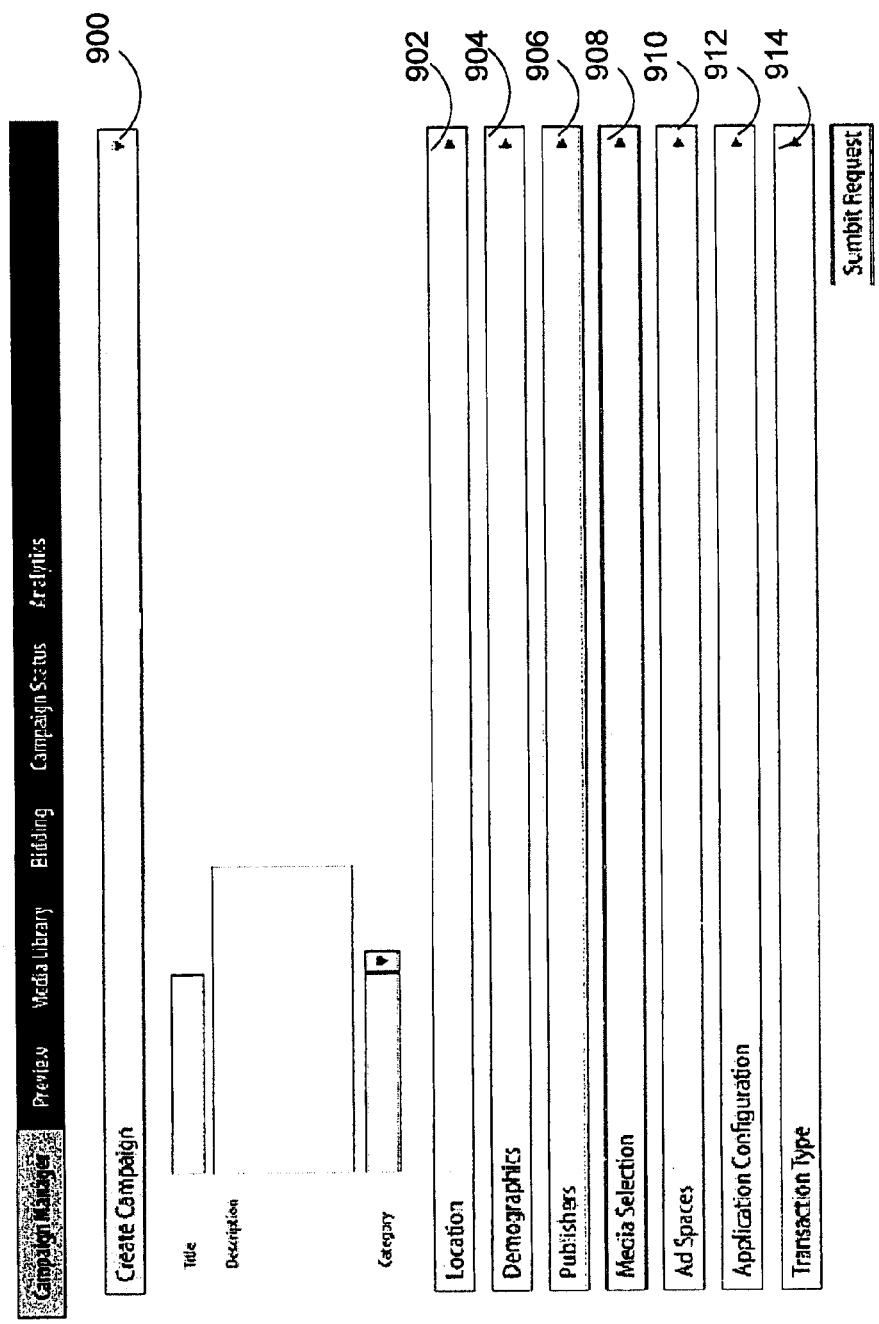
FIG. 10 illustrates a user interface for managing a system of buying and managing interactive video applications according to an exemplary embodiment.

Turning now to FIG. 10, illustrated is a user interface for the sponsor campaign manager 226. As described above, The content management system software 230 includes a sponsor campaign manager 226 that allows the sponsor to buy or bid on applications that are embedded at the hotspots as part of the video player skin. The sponsor space manager 226 is served by the sponsor space manager servlet 210 as part of the application server software 202 on the application server 108. As shown in FIG. 10, to create a new campaign as part of the step 320, the sponsor opens a create campaign panel 900 and names, describes, and defines the category of the new campaign (e.g., sport, entertainment, etc.). In one embodiment, the sponsor can define the geographic regions to which the sponsored content will be displayed as part of the campaign (e.g., North America, U.S.A., Texas, or Dallas) in the location panel 902. In another embodiment, the sponsor can define a target demographic by characteristics such as age, gender or hobbies in the demographics panel 904.

The sponsor selects applications that have been previously designated by a publisher as available for sponsorship in publishers panel 906. The media selection panel 908 presents the sponsor with available applications in an inventory, and allows the sponsor to add media assets, such as images, audio, video or text, to the applications. The sponsor campaign manager includes an ad spaces panel 910, which presents the sponsor with a interface operable to link available applications with sponsored content, such as phone number, email address, URL or location. These applications can be customized using an application configuration panel 912. The sponsor campaign manager 226 also includes a transaction type panel 914. Sponsors use the transaction type panel 914 to buy or bid on applications at the step 320, which applications are embedded using hypercode objects at hotspot in a video. In one embodiment, the sponsor chooses the transaction type for the purchase of applications as part of the new campaign. In one embodiment, the transaction type is money, which means the sponsor campaign manager 226 will automatically continue to purchase applications with the sponsor's content until the set amount of money is exhausted. In another embodiment, the transaction type is time period, which means the sponsor campaign manager 226 will automatically continue to purchase application with the sponsor's content until the set time period expires. In another embodiment, the sponsor's campaign may be organized on the basis of both a set amount of money and a set time period. In an exemplary embodiment, the sponsor campaign manager 226 presents the sponsor with a selection of video player skins and a customization panel for linking the skin with sponsored content.

After the sponsor chooses a video and selects from the available applications, the sponsor submits a request for approval of the sponsor's content from the relevant publisher(s). The publisher may accept or reject the sponsor's purchase of applications and/or the sponsor's content. If approved, the sponsor's content appears as part of the purchased applications embedded in the video.

To publish at the step 324, the content management session software 230 ends and the video is made available to the public. Interactive video player service 236 plays the video 234 stored on video server 104 back to the viewer. The interactive video player service servlet 216 provides video files and hypercode overlay files to a video player 236 that runs within a web browser or other client. The video player 236 or the web browser may initiate one or more interactive applications 232 served by application services servlet 214.

The video being played in the step 324 has interactive video applications 232 embedded into it by the application integration engine 220 at contextually relevant places defined earlier by the video context editor 222. The interactive video player servlet 216 allows interaction between the viewer and the embedded application. The interactive video player service servlet 216 also provide the video player skin, which is customized based on the video context, and is linked to embedded applications and sponsor messages. The interactive video player 236 also allows for viewer interaction tracking by application and video analytics 228. The interactive video player servlet 216 is served by the application services software 202.

In an exemplary embodiment, the interactive video player service servlet 216 loads data associated with a video 234, including video identifier data and hypercode object data, from hypercode overlay sever 106 in XML format. After loading this data, the interactive video player servlet 216 processes the data and begins playback. The hypercode object data contains hotspot placement information for hypercode objects linked with applications. The hypercode object data also contains data associated with the application, such as application identifier data and placement data.

The interactive video player 236 uses a common application programming interface for communicating with applications stored on application server 108. Application inputs and events are specified by the associated hypercode objects. For each application, the interactive video player 236 reads application-related data from the hypercode object and passes the data to the interactive video applications 232. The common application programming interface also allows bi-directional communication with the interactive video player service servlet 216 and application services servlet 214.

In an exemplary embodiment, to develop interactive application to embed into video or video player skins, the application development platform 238 (FIG. 2) is served by the application development platform service servlet 218 and is used to develop applications using reusable widget blocks and other development tools. The application development platform 238 is used to develop new applications and integrate third party applications with hypercode objects. Applications are built with "widget blocks," which are integrated by application developers to create new applications or new widget blocks. Widget blocks are run on the application server software 202. Widget block are available on a panel in the application services engine (as discussed above). Widget blocks are typically combined to create applications, which are embedded in a video or video player skin. In one embodiment, applications are Web applications that provide the viewer various ways to interact with the video and the associated content placed by publishers and sponsors. In another embodiment, applications are attached to sponsored content and activated by viewer interactions, or are activated base on a timed event, or some other event.

The communication category of widget block initiates and creates outgoing audio, video, and text (e.g., chat) sessions, handles incoming audio, video, and text sessions, and the addition or deletion of multimedia streams in an existing session. For example, an interactive video stream can be added to an existing audio session, or a video stream can be dropped from an existing audio and video session. Other examples of communication widget blocks include a presence widget block, a click-to-call widget block, a multi party conferencing widget block, a session-on-hold widget block, a session forwarding widget block, a session transfer widget block, etc. The gaming category of widget blocks provides capabilities to support multiplayer strategy games, search-based games, etc. The messaging category of widget blocks provides capabilities to send and receive short messaging service (SMS) texts and multimedia messaging service (MMS), sending and receiving email messages, performing text-to-voice and voice-to-text services for messaging, Instant Messaging/Chat, etc. The mapping category of widget blocks provides capabilities for integrating with mapping and geographic information systems (GIS), etc.

The above-described widget blocks can be combined and integrated, along with video and other content, to create visually rich, engaging interactive video applications using the application development platform 238. An application developer designs, configures, and connects the widget blocks and other graphical user interface components to create the interactive video application logic. Because the underlying widget blocks and other components are network- and platform-independent, the resulting interactive video application can run on any client platform and communicate over any network. Thus, a single interactive video can be made available to a variety of clients, including personal computers, televisions, set-top boxes, mobile phones, and game consoles.

The application development platform 238 provides a mechanism for converting a completed interactive video application into a new widget block. The new widget block can then be saved into a widget block library, allowing the completed interactive video application itself to be reused as a component of other interactive video applications. In this way, an interactive video application can build on other interactive video applications to provide increasingly complex services to an user. An application developer can also create new widget blocks by importing functionality from another source, such as a custom-written source code, a Web service, an application programming interface, or any other source.

The different types of applications include: (i) location based maps capable of showing the viewer retail stores proximate to the viewer's location; (ii) click to call applications to establish direct communication with a viewer through a landline, cellular, VOIP network, or call to a sales representative or a technical support representative; (iii) SMS applications to deliver trial offers, coupons, or discount offers to the viewer, or sending a view request to viewer's friends; (iv) feedback applications to gather text, audio, or video responses from viewers of the video and to display these responses to publishers, sponsors, or other viewers; (v) polling applications to present viewer surveys and gather responses; (vi) quiz applications to present quizzes to viewers in the context of education videos, sports videos, or other videos; (vii) presentation applications used for creating slideshows and animations to show in conjunction with a video. In an exemplary embodiment, a presentation application presents predefined animations, slide transitions, and other interactivity within the presentation application, and the viewer can add other applications into a slide.

Figure 11:
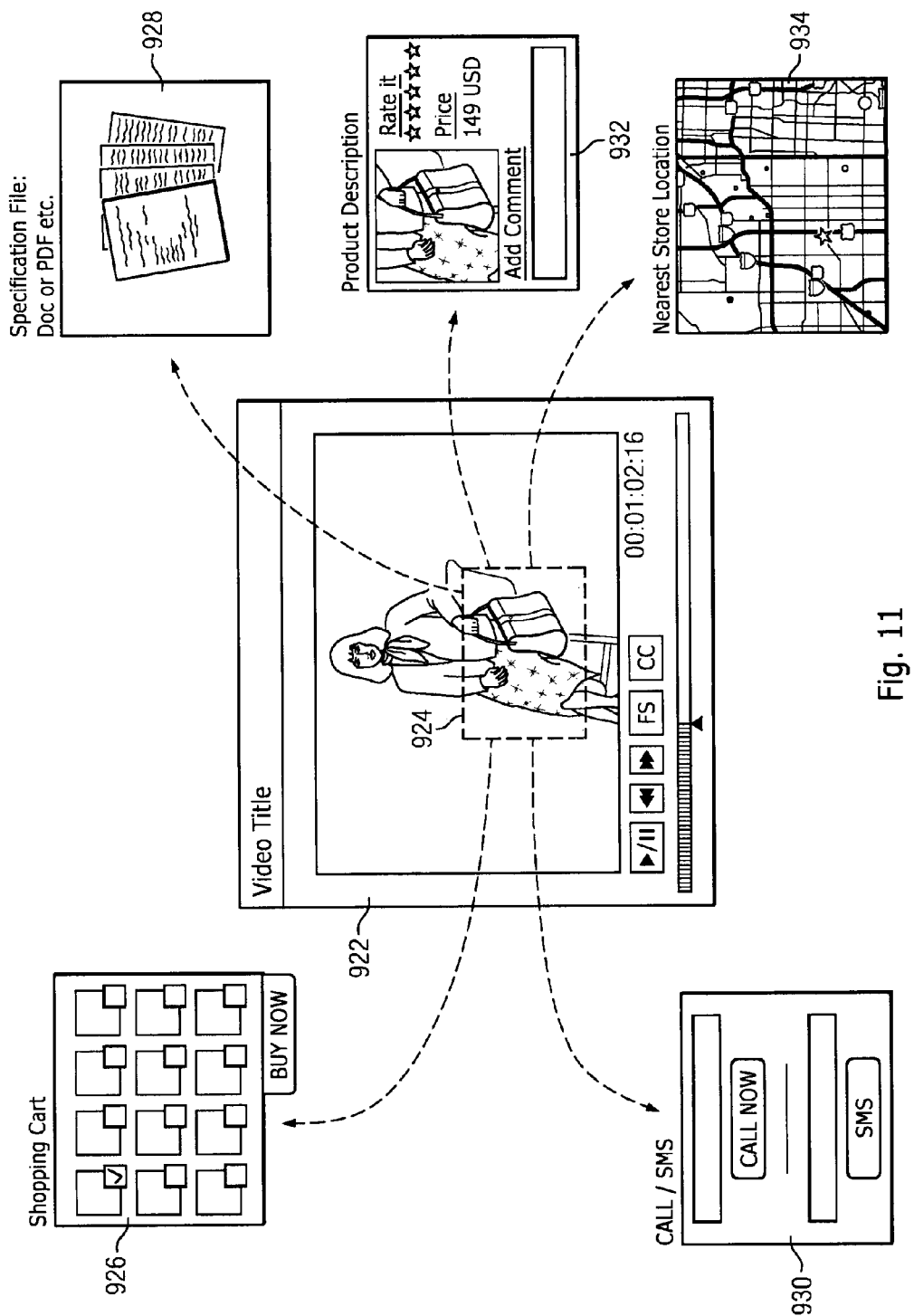
FIG. 11 illustrates an interactive video application that can be created and delivered using the system of FIG. 1 and the software architecture of FIG. 2 according to an exemplary embodiment.

FIG. 11 illustrates an interactive video and embedded applications that can be created and delivered using the system of FIG. 1 and the software architecture of FIG. 2. The interactive video and embedded applications could be viewed and used on any of the clients 112-118. Interactive video 922 of a woman contains a hotspot 924 that has been created over the woman's purse. The hotspot 924 can trigger any of a variety of interactive applications, include a shopping cart 926, a document download 928, a phone call or SMS message 930, a product rating 932 and a store locator map 934. The shopping cart 926 permits a viewer to purchase the woman's purse immediately on-line. The document download 928 provides the viewer with more information about the purse, such as the available colors, information about the manufacturer, and other details. The phone call or SMS message 930 allows the viewer to immediately contact a sales representative from the purse seller or manufacturer to get more information about the purse. The viewer can simply provide his or her telephone number and receive a phone call connecting to the sales representative, or alternatively receive an SMS text message to initiate a chat session with the sales representative. The product rating 932 permits the viewer to enter a rating for the purse and comment on the purse. The nearest store locator 934 allows the viewer to provide an address and get information about stores near that location where the purse is for sale. The nearest store locator 934 can also provide driving directions from a provided address. Alternately, if the viewer is interacting with the interactive 922 on a mobile phone or other device with location information, the user can obtain information about and directions to the store nearest to the viewer's current location. Thus, it will be appreciated that the interactive video and embedded applications allows a viewer to engage with and interact with a video in ways not previously possible.

The interactive video and embedded applications also reports on the viewer's engagement in the application & video analytics 228. The analytics server 110 records information about the viewer's actions, such as which hotspots the viewer clicked on, which parts of the interactive video 922 if any were replayed and how many times, which parts of the interactive video 922 if any were skipped over. This information may be sent as each action is recorded, at a predetermined interval, or when the viewer takes an action, such as closing or navigating away from the interactive video 922. The application & video analytics 228 then compiles the information from all instances of the interactive video 922 and generates reports for the video content owner, sponsor, or other interested party. In an exemplary embodiment, analytics server 110 records interactions with applications embedded by the hypercode objects in the interactive video 922 and/or the video player skin. For example, a viewer can click on a hypercode object to trigger an application that delivers additional sponsor content to the viewer's email address. This action is analyzed by the publisher and/or sponsor using application & video analytics 228 to improve delivery of applications and sponsor content. In this way, application & video analytics 228 assists sponsors in selecting, positioning, and customizing applications that will generate the most revenue for the publisher or sponsor.

Additional example interactive video application are described as follows

Example Interactive Video Application 1

A first example interactive video application is a real-estate browsing application. The application combines functionality provided by various widget blocks such as click-to-talk, instant messaging, voice mail, email, video conferencing, multiple listing service listings, interactive video, searching, and maps. The real-estate browsing application allows a viewer to search for and view homes via interactive video. The viewer can then communicate with a real-estate listing agent via voice call, SMS, email, voicemail, instant message, video conference, or any other supported form of communication. The viewer can invite additional individuals, such as family or friends, to join the conversation or to view the interactive video. Thus, the viewer can engage in a visually rich and meaningful home search with extensive participation by the real-estate agent, family and friends.

Example Interactive Video Application 2

Another example interactive video application is an interactive advertisement in a video offered by a video-on-demand system. A viewer selects a video to watch, which launches the interactive video application. Alternatively, the viewer may select a video to watch from within another interactive video application. The selected video begins to play, and during the playback one or more hotspots appear to indicate to the viewer that more information is available about certain objects within the video. The objects may be highlighted for the viewer by visible highlighting, such as dimming or lightening effects, contrast or saturation adjustments, or outlining, any other technique. If the viewer interacts with a highlighted object, such as by using any input device including a keyboard, mouse, touch screen, or remote-control, an event in the interactive video application is triggered. The event causes the video to pause and opens a new window with information about the object. Alternatively, the video may continue to play in the background. The information in the new window may be in audio, video, text, or any other form, and may provide the user with features for buying the object, jumping to another video or website about the object, or any other interactive feature. The viewer may then close the newly opened window and resume watching the selected video.

Example Interactive Video Application 3

Another example interactive video application is an interactive advertisement in a live video. A viewer watches a live video feed that may include news, a sporting event, or any suitable content. An interactive advertisement is placed on the live video stream and may be highlighted using a frame, glowing spot, or any other suitable technique. If the viewer interacts with the interactive advertisement, such as by using any input device including a keyboard, mouse, touch screen, or remote-control, an event in the interactive video application is triggered and causes a pop-up window or screen overlay to appear with more information. The viewer may be offered options such as receiving a coupon by email, SMS message, or contacting a sales agent by phone or video conference.

Example Interactive Video Application 4

Another example interactive video application is a context-sensitive interactive advertisement placed in a video, which may be live video or stored video. Based on tags associated with the video, an interactive advertisement is selected from a library of interactive advertisements. In this way, the selected interactive advertisement is relevant to the video already being watched and is more likely to be of interest to the viewer. For example, a viewer watching a music video can be shown an interactive advertisement for an upcoming music concert being performed in the viewer's local area. As another example, a viewer watching a movie can be shown advertisements for other movies starring some of the same actors as the watched movie.

Example Interactive Video Application 5

Yet another example interactive video application is an interactive instructional video. A viewer watches the interactive instructional video, which can be an educational video for new employees, an installation guide video, or any other kind of instructional video. At various points in the video, navigable objects overlay the video and allow the user to make navigation choices. For example, the choices may allow a viewer to replay a section or to jump from one video section to another related section or video. Alternatively, the viewer may be prompted to answer a question regarding the video section just viewed. If the viewer answers correctly, the video continues playing normally. If the viewer answers incorrectly, the previous video section is replayed so that the user can learn the information needed to answer the question. Thus, the viewer who completes watching the video will have demonstrated that the user learned the material.

Figure 12:
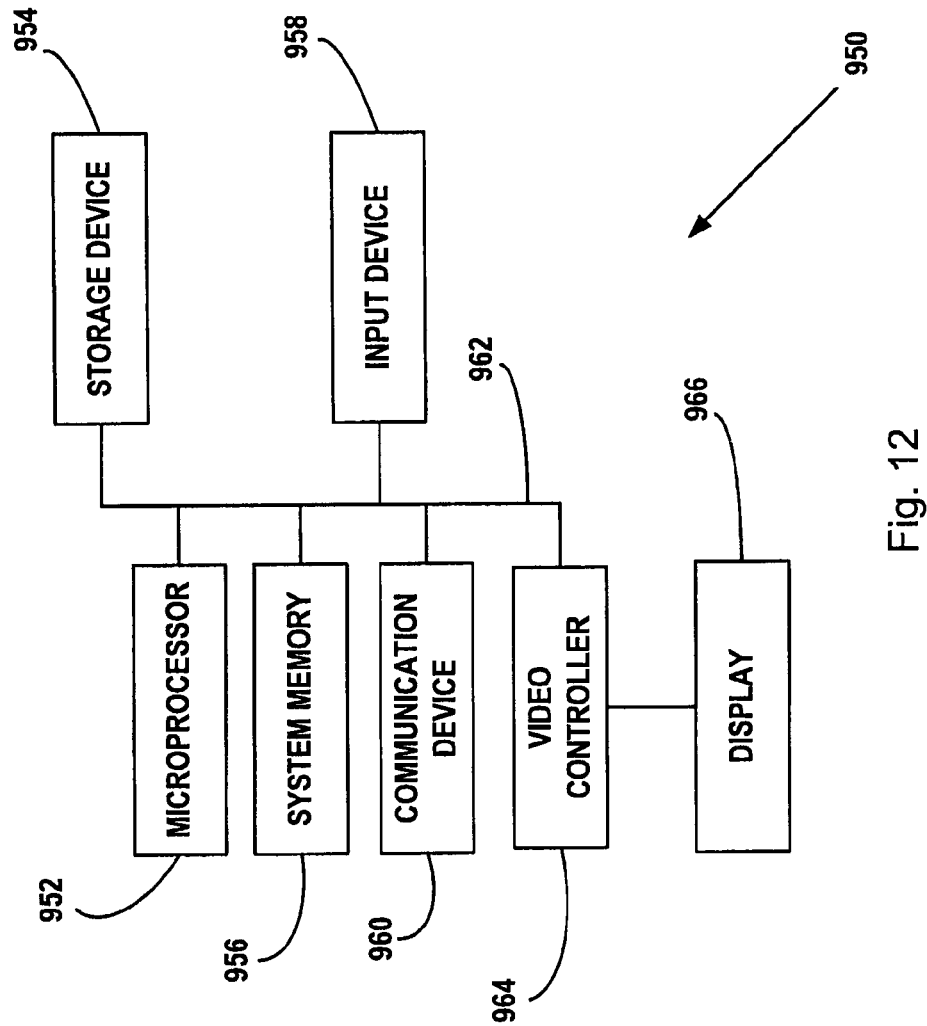
FIG. 12 is a diagrammatic illustration of a node for implementing one or more exemplary embodiments of the present disclosure.

In an exemplary embodiment, as illustrated in FIG. 12, an illustrative node 950 for implementing one or more embodiments of one or more of the above-described networks, elements, methods and/or steps, and/or any combination thereof, is depicted. The node 950 includes a microprocessor 952, an input device 958, a storage device 954, a video controller 964, a system memory 956, a display 966, and a communication device 960 all interconnected by one or more buses 962. In several exemplary embodiments, the storage device 954 may include a floppy drive, hard drive, CD-ROM, optical drive, any other form of storage device and/or any combination thereof. In several exemplary embodiments, the storage device 954 may include, and/or be capable of receiving, a floppy disk, CD-ROM, DVD-ROM, or any other form of computer-readable medium that may contain executable instructions. In several exemplary embodiments, the communication device 960 may include a modem, network card, or any other device to enable the node to communicate with other nodes. In several exemplary embodiments, any node represents a plurality of interconnected (whether by intranet or Internet) computer systems, including without limitation, personal computers, mainframes, PDAs, and cell phones.

In several exemplary embodiments, one or more of the system 100, the software architecture 200, and/or component thereof, are, or at least include, the node 950 and/or components thereof, and/or one or more nodes that are substantially similar to the node 950 and/or components thereof.

In several exemplary embodiments, the system 100 typically includes at least hardware capable of executing machine readable instructions, as well as the software for executing acts (typically machine-readable instructions) that produce a desired result. In several exemplary embodiments, system 100 may include hybrids of hardware and software, as well as computer sub-systems. In several exemplary embodiments, hardware may include any physical device that is capable of storing machine-readable instructions, such as memory or other data storage devices. In several exemplary embodiments, other forms of hardware include hardware sub-systems, including transfer devices such as modems, modem cards, ports, and port cards, for example.

In several exemplary embodiments, the software architecture 200 includes any machine code stored in any memory medium, such as RAM or ROM, and machine code stored on other devices (such as floppy disks, flash memory, or a CD ROM, for example). In several exemplary embodiments, the software architecture 200 may include source or object code. In several exemplary embodiments, the software architecture 200 encompasses any set of instructions capable of being executed on a node such as, for example, on a client machine or server.

In several exemplary embodiments, combinations of software and hardware could also be used for providing enhanced functionality and performance for certain embodiments of the present disclosure. In an exemplary embodiment, software functions may be directly manufactured into a silicon chip. Accordingly, it should be understood that combinations of hardware and software are also included within the definition of a computer system and are thus envisioned by the present disclosure as possible equivalent structures and equivalent methods.

In several exemplary embodiments, computer readable mediums include, for example, passive data storage, such as a random access memory (RAM) as well as semi-permanent data storage such as a compact disk read only memory (CD-ROM). One or more exemplary embodiments of the present disclosure may be embodied in the RAM of a computer to transform a standard computer into a new specific computing machine. In several exemplary embodiments, data structures are defined organizations of data that may enable an embodiment of the present disclosure. In an exemplary embodiment, a data structure may provide an organization of data, or an organization of executable code.

In several exemplary embodiments, the network 102, and/or one or more portions thereof, may be designed to work on any specific architecture. In an exemplary embodiment, one or more portions of the network 102 may be executed on a single computer, local area networks, client-server networks, wide area networks, internets, hand-held and other portable and wireless devices and networks.

In several exemplary embodiments, the database server software 242 may be any standard or proprietary database software, such as Oracle, Microsoft Access, SyBase, or DBase II, for example. In several exemplary embodiments, the database server software 242 may have fields, records, data, and other database elements that may be associated through database specific software. In several exemplary embodiments, data may be mapped. In several exemplary embodiments, mapping is the process of associating one data entry with another data entry. In an exemplary embodiment, the data contained in the location of a character file can be mapped to a field in a second table. In several exemplary embodiments, the physical location of the database server software 242 is not limiting, and the database may be distributed. In an exemplary embodiment, the database server software 242 may exist remotely from the application server software 202, and run on a separate platform. In an exemplary embodiment, the database server software 242 may be accessible across the Internet. In several exemplary embodiments, more than one database may be implemented.

In an exemplary embodiment, the system 100 with the software architecture 200 provides a system for a video publisher is provided that associates and pushes relevant, interactive and targeted applications to viewers of videos on any multimedia client, such as a personal computer, gaming device, or mobile device.

In an exemplary embodiment, the system 100 with the software architecture 200 provides a system is provided that dynamically places on a video a set of interactive applications on a video player skin or on hotspots within a video stream using hypercode objects. One or more exemplary hypercode objects, and/or portions or combinations thereof, may be implemented according to the examples files provided in the Appendices below. This placement allows a publisher to link interactive call-to-action applications to the video that are customized based on the context of the video. The interactive applications can be sponsored by any sponsor desiring media viewer interaction with these call-to-action applications. When the video is played by a viewer, the system determines the location and demographics of the viewer and pushes demographically and contextually relevant interactive call-to-action applications as part of the video and video player.

In an employ embodiment, the system 100 with the software architecture 200 provides a system for a video publisher is provided that embeds interactive applications in the video player skin or in hotspots in the video stream. The embedded interactive applications can be activated based on time, viewer interaction, or some other event. These applications follow the video virally on any client on which the video player is located.

In an employ embodiment, the system 100 with the software architecture 200 provides a system by which custom applications may be developed using widgets on an application development platform that allows developers and others to create interactive applications and integrate them with the video. The system also records and provides statistics related to various relevant parameters for analyzing and improving the delivery of the applications to viewers and provides metrics relevant to the publisher and sponsor for business intelligence and commercial use. The applications provide a rich and engaging video experience to the viewer and a monetization solution for the video publisher while effectively delivering the sponsor's messages to viewers.

A method has been described that includes identifying a hotspot in a portion of a video content, overlaying a hypercode object on the hotspot at a spatial point, causing the hypercode object to be displayed at a temporal point during playback of the video content, and providing an interactive application in response to activation of the hypercode object. In an exemplary embodiment, the method includes analyzing the video content at the spatial point and the temporal point and isolating at least one graphical object detected in the video content at the spatial point and the temporal point. In an exemplary embodiment, the method includes receiving a temporal range comprising a start time and an end time, wherein the starting time is the temporal point, and tracking a movement of the graphical object in the video content with the hypercode object beginning at the start time and continuing until the end time. In an exemplary embodiment, the isolating the at least one graphical object comprises: isolating multiple graphical objects in the video content, providing a list of the multiple graphical objects; and receiving a selection of one graphical object from the list. In an exemplary embodiment, the method includes defining a context for the video content and selecting the interactive application according to the context. In an exemplary embodiment, the method includes providing the interactive application further pauses playback of the video content. In an exemplary embodiment, the interactive application displays advertising content. In an exemplary embodiment, the method includes modifying the timing or location of the hypercode object. In an exemplary embodiment, the method includes making the interactive application available to a sponsor and customizing the interactive application according to a request by the sponsor. In an exemplary embodiment, the method includes obtaining data related to viewer interaction with the interactive application and revising the interactive application based on the data. In an exemplary embodiment, the hypercode object is an XML file.

An apparatus has been described that includes a computer-readable physical medium containing instructions executable on a computer that when executed cause the computer to identify hotspot in a portion of a video content, overlay a hypercode object on the hotspot at a spatial point, cause the hypercode object to be displayed at a temporal point during playback of the video content, and provide an interactive application in response to activation of the hypercode object. In an exemplary embodiment, the computer-readable physical medium contains instructions executable on a computer that when executed further cause the computer to analyze the video content at the spatial point and the temporal point and isolate at least one graphical object detected in the video content at the spatial point and the temporal point. In an exemplary embodiment, the computer-readable physical medium contains instructions executable on a computer that when executed further cause the computer to: receive a temporal range comprising a start time and an end time, wherein the starting time is the temporal point and track a movement of the graphical object in the video content with the hypercode object beginning at the start time and continuing until the end time. In an exemplary embodiment, the computer-readable physical medium contains instructions executable on a computer that when executed further cause the computer to: isolate multiple graphical objects in the video content, provide a list of the multiple graphical objects and receive a selection of one graphical object from the list. In an exemplary embodiment, the computer-readable physical medium contains instructions executable on a computer that when executed further cause the computer to define a context for the video content and select the interactive application according to the context. In an exemplary embodiment, the computer-readable physical medium contains instructions executable on a computer that when executed cause the computer to pause playback of the video content upon activation of the hypercode object. In an exemplary embodiment, the interactive application displays advertising content. In an exemplary embodiment, the computer-readable physical medium contains instructions executable on a computer that when executed further cause the computer to modify the timing or location of the hypercode object. In an exemplary embodiment, the computer-readable physical medium contains instructions executable on a computer that when executed further cause the computer to make the interactive application available to a sponsor and customize the interactive application according a request by the sponsor. In an exemplary embodiment, the computer-readable physical medium contains instructions executable on a computer that when executed further cause the computer to obtain data related to viewer interaction with the interactive application; and revise the interactive application based on the data.

A system has been described that includes an interactive video player responsive to a video content request to provide a video content to a client device, a video content editor responsive to a request to track movement of an object in the video content automatically and thereby generate a hypercode object, an application integration engine responsive to a request to link an interactive application to the hypercode object on the video content, the hypercode overlay incorporating the object motion data, and an analytics server responsive to receipt of user interaction data from the client device to store the user interaction data in a database. In an exemplary embodiment, the hypercode object is an XML file. In an exemplary embodiment, the user interaction data indicates whether a user at the client device initiated the interactive application linked with the hypercode object.

A system has been described that a means for identifying a hotspot in a portion of a video content, a means for overlaying a hypercode object on the hotspot at a spatial point, a means for causing the hypercode object to be displayed at a temporal point during playback of the video content, and a means for providing an interactive application in response to activation of the hypercode object. In an exemplary embodiment, the system includes a means for analyzing the video content at the spatial point and the temporal point and a means for isolating at least one graphical object detected in the video content at the spatial point and the temporal point. In an exemplary embodiment, the system includes a means for receiving temporal range comprising a start time and an end time, wherein the starting time is the identified point and means for tracking a movement of the graphical object in the video content with the hypercode object beginning at the start time and continuing until the end time. In an exemplary embodiment, the isolating the at least one graphical object comprises: means for isolating multiple graphical objects in the video content, means for providing a list of the multiple graphical objects and means for receiving a selection of one graphical object from the list. In an exemplary embodiment, the system includes a means for defining a context for the video content and a means for selecting the interactive application according to the context. In an exemplary embodiment, the means for providing the interactive application further pauses playback of the video content. In an exemplary embodiment, the interactive application displays advertising content. In an exemplary embodiment, the system includes a means for modifying the timing or location of the hypercode object. In an exemplary embodiment, the system includes a means for making the interactive application available to a sponsor and means for customizing the interactive application according a request by the sponsor. In an exemplary embodiment, the system includes a means for obtaining data related to viewer interaction with the interactive application and a means for revising the interactive application based on the data. In an exemplary embodiment, the hypercode object is an XML file.

A method has been described that includes associating at least one interactive application with a video, the at least one interactive application being contextually relevant to the subject matter of the video, wherein associating at least one interactive application with the video comprises at least one of the following: embedding the at least one interactive application on a video player skin that is proximate to the video during playback of the video, and embedding the at least one interactive application in one or more hotspots within the video and activating the at least one interactive application in response to the one or more of the following: the passage of one or more time periods during playback of the video and one or more interactions initiated by one or more viewers of the video during playback of the video, wherein the at least one interactive application is sponsored by a sponsor and comprises one or more of the following: one or more messages from the sponsor, each of the one or more messages being relevant to the subject matter of the video and one or more call-to-action applications, each of the one or more call-to action applications comprising a request that the one or more viewers of the video initiate at least one action that is relevant to the subject matter of the video.

A system has been described that includes a computer readable medium comprising a plurality or instruction stored therein, the plurality or instruction comprising: instructions for associating at least one interactive application with a video, the at least one interactive application being contextually relevant to the subject matter of the video, wherein the instructions for associating at least one interactive application with the video comprises at least one of the following: instructions for embedding the at least one interactive application on a video player skin that is proximate to the video during playback of the video, and instructions for embedding the at least one interactive application in one or more hotspots within the video and instructions for activating the at least one interactive application in response to the one or more of the following: the passage of one or more time periods during playback of the video and one or more interactions initiated by one or more viewers of the video during playback of the video, wherein the at least one interactive application is sponsored by a sponsor and comprises one or more of the following: one or more messages from the sponsor, each of the one or more messages being relevant to the subject matter of the video and one or more call-to-action applications, each of the one or more call-to action applications comprising a request that the one or more viewers of the video initiate at least one action that is relevant to the subject matter of the video.

It is understood that variations may be made in the foregoing without departing from the scope of the disclosure.

In several exemplary embodiments, while different steps, processes, and procedures are described as appearing as distinct acts, one or more of the steps, one or more of the processes, and/or one or more of the procedures may also be performed in different orders, simultaneously and/or sequentially. In several exemplary embodiments, the steps, processes and/or procedures may be merged into one or more steps, processes and/or procedures.

In several exemplary embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several exemplary embodiments have been described in detail above, the embodiments described are exemplary only and are not limiting, and those skilled in the art will readily appreciate that many other modifications, changes and/or substitutions are possible in the exemplary embodiments without materially departing from the novel teachings and advantages of the present disclosure. Accordingly, all such modifications, changes and/or substitutions are intended to be included within the scope of this disclosure as defined in the following claims. In the claims, means-plus-function clauses are intended to cover the structures described herein as performing the recited function and not only structural equivalents, but also equivalent structures.

APPENDIX 1

Sample Hypercode Object XML file:

```
<?xml version="1.0" encoding="UTF-8"?>
<cimple:IvSpots xmlns:cimple="http://www.example.org/IvSpotsSchema"
xmlns:xsi="http://www.w3.org/2001/XMLSchema-instance"
xsi:schemaLocation="http://www.example.org/IvSpotsSchema
IvSpotsSchema.xsd ">
    <cimple:IvSpot id=" ">
      <cimple:Appearance>
         <cimple:ivType>cimple:ivType</cimple:ivType>
         <cimple:ivColor>cimple:ivColor</cimple:ivColor>
         <cimple:ivText>cimple:ivText</cimple:ivText>
         <cimple:ivAlpha>cimple:ivAlpha</cimple:ivAlpha>
         <cimple:name>cimple:name</cimple:name>
      </cimple:Appearance>
      <cimple:Behaviour>
         <cimple:rollOver>true</cimple:rollOver>
         <cimple:rolloverWinType>cimple:rolloverWinType</cimple:rolloverWinType>
         <cimple:rolloverWinColor>cimple:rolloverWinColor</cimple:rolloverWinColor>
         <cimple:rolloverText>cimple:rolloverText</cimple:rolloverText>
      </cimple:Behaviour>
      <cimple:ivTime>
         <cimple:startTime>12:00:00</cimple:startTime>
         <cimple:duration>0.0</cimple:duration>
      </cimple:ivTime>
      <cimple:Dimensions>
         <cimple:height>0</cimple:height>
         <cimple:width>0</cimple:width>
         <cimple:start_x>0</cimple:start_x>
         <cimple:start_y>0</cimple:start_y>
      </cimple:Dimensions>
      <cimple:embedded>
         <cimple:type>cimple:type</cimple:type>
         <cimple:hyperlink>cimple:hyperlink</cimple:hyperlink>
         <cimple:description>cimple:description</cimple:description>
         <cimple:tags>cimple:tags</cimple:tags>
      </cimple:embedded>
      <cimple:ad>
         <cimple:campaign_id>0</cimple:campaign_id>
         <cimple:banner_id>0</cimple:banner_id>
      </cimple:ad>
      <cimple:tool_tip>
         <cimple:description>cimple:description</cimple:description>
         <cimple:type>cimple:type</cimple:type>
         <cimple:font>
            <cimple:font>Aerial</cimple:font>
            <cimple:size>10</cimple:size>
            <cimple:color>0xFFFFFF</cimple:color>
         </cimple:font>
         <cimple:tipColor>cimple:tipColor</cimple:tipColor>
         <cimple:alpha>0.0</cimple:alpha>
      </cimple:tool_tip>
      <cimple:ivMov>
         <cimple:id>cimple:id</cimple:id>
         <cimple:time>
            <cimple:startTime>12:00:00</cimple:startTime>
            <cimple:duration>0.0</cimple:duration>
```

APPENDIX 1-continued

Sample Hypercode Object XML file:

```
         </cimple:time>
         <cimple:scale_x>0.0</cimple:scale_x>
         <cimple:scale_y>0.0</cimple:scale_y>
         <cimple:rotation>0.0</cimple:rotation>
         <cimple:color>cimple:color</cimple:color>
         <cimple:alpha>0.0</cimple:alpha>
         <cimple:transition>cimple:transition</cimple:transition>
         <cimple:target_x>0</cimple:target_x>
         <cimple:target_y>0</cimple:target_y>
      </cimple:ivMov>
   </cimple:IvSpot>
</cimple:IvSpots>
```

APPENDIX 2

Example Hypercode XML file for audio hotspot

```
<?xml version="1.0" encoding="UTF-8"? >
<cimple:IvSpots xmlns:cimple="http://www.example.org/IvSpotsSchema"
xmlns:xsi="http://www.w3.org/2001/XMLSchema-instance"
xsi:schemaLocation="http://www.example.org/IvSpotsSchema
IvSpotsSchema.xsd ">
   <cimple:IvSpot>
      <cimple:id>0</cimple:Id>
      <cimple:Appearance>
         <cimple:ivType>cimple:ivType</cimple:ivType>
      </cimple:Appearance>
<cimple:embedded>
         <cimple:audio>cimple:audio_path</cimple:audio>
</cimple:embedded>
</cimple:IvSpot>
</cimple:IvSpots>
```

APPENDIX 3

Example Hypercode XML file for video hotspot

```
   <cimple:IvSpot>
      <cimple:id>0</cimple:id>
      <cimple:Appearance>
         <cimple:ivType>cimple:ivType</cimple:ivType>
      </cimple:Appearance>
   <cimple:embedded>
         <cimple: image>cimple:image_path</cimple: image>
   </cimple:embedded>
   </cimple:IvSpot>
   </cimple:IvSpots>
```

APPENDIX 4

Example Hypercode XML file for text hotspot

```
   <cimple:IvSpot>
      <cimple:id>0</cimple:id>
      <cimple:Appearance>
         <cimple:ivType>cimple:textIVSpot</cimple:ivType>
         <cimple:ivText>cimple:ivText</cimple:ivText>
      </cimple:Appearance>
   </cimple:IvSpot>
   </cimple:IvSpots>
```

APPENDIX 5

Example Hypercode XML file motion-tracking hotspot

```
<cimple:id>0</cimple:id>
   <cimple:Appearance>
      <cimple:ivType>cimple:ivType</cimple:ivType>
      <cimple:ivColor>cimple:ivColor</cimple:ivColor>
```

APPENDIX 5-continued

Example Hypercode XML file motion-tracking hotspot

```
        <cimple:ivText>cimple:ivText</cimple:ivText>
        <cimple:ivAlpha>cimple:ivAlpha</cimple:ivAlpha>
        <cimple:name>cimple:name</cimple:name>
    </cimple:Appearance>
<cimple:Dimensions>
        <cimple:height>0</cimple:height>
        <cimple:width>0</cimple:width>
        <cimple:start_x>0</cimple:start_x>
        <cimple:start_y>0</cimple:start_y>
    </cimple:Dimensions>
<cimple:ivMov>
        <cimple:id>cimple:id</cimple:id>
        <cimple:time>
            <cimple:startTime>12:00:00</cimple:startTime>
            <cimple:duration>0.0</cimple:duration>
        </cimple:time>
<cimple:scale_x>0.0</cimple:scale_x>
        <cimple:scale_y>0.0</cimple:scale_y>
        <cimple:rotation>0.0</cimple:rotation>
        <cimple:color>cimple:color</cimple:color>
        <cimple:alpha>0.0</cimple:alpha>
        <cimple:transition>cimple:transition</cimple:transition>
        <cimple:target_x>0</cimple:target_x>
        <cimple:target_y>0</cimple:target_y>
        <cimple:control_x>0</cimple: control _x >
        <cimple: control_y>0</cimple: control_y>
    </cimple:ivMov>
</cimple:IvSpot>
```

What is claimed is:

1. A method comprising:
identifying a hotspot in a portion of a video content;
overlaying a hypercode object on the hotspot at a spatial point;
presenting the hypercode object at a temporal point during playback of the video content;
providing an interactive application embedded in a video player skin that is proximate to the video in response to activation of the hypercode object, wherein content of the interactive application is contextually related to subject matter of the portion of the video content, wherein the interactive application is customized based on time, viewer interaction data, viewer demographic data, and viewer location data;
identifying a second hotspot in a second portion of the video content;
overlaying a second hypercode object on the second hotspot at a second spatial point;
presenting the second hypercode object at a second temporal point during playback of the video content;
providing a second interactive application embedded in the video player skin that is proximate to the video in response to activation of the second hypercode object, wherein content of the second interactive application is contextually related to subject matter of the second portion of the video content, wherein the second interactive application is customized based on time, viewer interaction data, viewer demographic data and viewer location data; and
recording information corresponding to viewer interactions with the video content, wherein the recorded information indicates hotspots that have been selected, wherein the recorded information indicates that a first portion of the video content was replayed, and wherein the recorded information indicates an amount of times that the first portion of the video content was replayed.

2. The method of claim 1 further comprising:
analyzing the video content at the spatial point and the temporal point; and
isolating at least one graphical object detected in the video content at the spatial point and the temporal point.

3. The method of claim 2 further comprising:
receiving a temporal range comprising a start time and an end time, wherein the start time is the temporal point; and
tracking a movement of the graphical object in the video content with the hypercode object beginning at the start time and continuing until the end time.

4. The method of claim 2 wherein the isolating the at least one graphical object comprises:
isolating multiple graphical objects in the video content;
providing a list of the multiple graphical objects; and
receiving a selection of one graphical object from the list.

5. The method of claim 1 further comprising:
defining a context for the video content; and
selecting the interactive application according to the context.

6. The method of claim 1 wherein providing the interactive application further pauses playback of the video content.

7. The method of claim 1 wherein the interactive application displays advertising content.

8. The method of claim 1 further comprising:
modifying the temporal point or the spatial point of the hypercode object.

9. The method of claim 1 further comprising:
making the interactive application available to a sponsor; and
customizing the interactive application according to a request by the sponsor.

10. The method of claim 1 further comprising:
obtaining data related to viewer interaction with the interactive application; and
revising the interactive application based on the data.

11. The method of claim 1 wherein the hypercode object is provided by an XML file.

12. The method of claim 1 wherein the interactive application and the second interactive application are displayed simultaneously.

13. The method of claim 1 wherein the hotspot is highlighted by one or more of the following: dimming effects; lightening effects; contrast adjustments; saturation adjustments; a frame; a glowing spot; and outlining.

14. The method of claim 1 wherein the temporal point is an activation time along a virtual timeline.

15. A system comprising:
an interactive video player to provide a video content to a client device;
a video context editor to:
track movement of an object in the video content automatically and thereby generate a hypercode object at a temporal point during playback of the video content, wherein the hypercode object is overlayed on the object at a spatial point; and
generate a second hypercode object at a second temporal point during playback of the video content, wherein the hypercode object is overlayed on a second object at a second spatial point; and
an application integration engine to:
link an interactive application to the hypercode object based on the video content, wherein content of the interactive application is contextually related to subject matter of the video content, and wherein the interactive application is activated based on time, user interaction data, user demographic data, and user location data; and link a second interactive application to the second hypercode object, wherein content of the second interactive application is contextually related to subject matter of the video content, and wherein the second interactive application is activated based on time, user interaction data, user demographic data, and user location data; and a video analytics server to:

record information corresponding to viewer interactions with the video content, wherein the recorded information indicates hotspots that have been selected, wherein the recorded information indicates that a first portion of the video content was replayed, and wherein the recorded information indicates an amount of times that the first portion of the video content was replayed.

16. The system of claim 15 wherein the hypercode object is provided by an XML file.

17. The system of claim 15 wherein the user interaction data indicates whether a user at the client device initiated the interactive application linked with the hypercode object.

18. The system of claim 15 further comprising:
means for analyzing the video content at the spatial point and the temporal point; and
means for isolating at least one graphical object detected in the video content at the spatial point and the temporal point.

19. The system of claim 15 further comprising:
means for making the interactive application available to a sponsor; and
means for customizing the interactive application according a request by the sponsor.

20. A non-transitory computer readable medium containing instructions that when executed to cause a machine to:

identify a hotspot in a portion of a video content;
overlay a hypercode object on the hotspot at a spatial point;
present the hypercode object at a temporal point during playback of the video content;
provide an interactive application embedded in a video player skin that is proximate to the video in response to activation of the hypercode object, wherein content of the interactive application is contextually related to subject matter of the portion of the video content, wherein the interactive application is provided based on time, viewer interaction data, viewer demographic data, and viewer location data;
identify a second hotspot in a second portion of the video content;
overlay a second hypercode object on the second hotspot at a second spatial point;
present the second hypercode object at a second temporal point during playback of the video content;
provide a second interactive application embedded in the video player skin that is proximate to the video in response to activation of the second hypercode object, wherein content of the second interactive application is contextually related to subject matter of the second portion of the video content, wherein the second interactive application is provided based on time, viewer interaction data, viewer demographic data and viewer location data; and
record information corresponding to viewer interactions with the video content, wherein the recorded information indicates hotspots that have been selected, wherein the recorded information indicates that a first portion of the video content was replayed, and wherein the recorded information indicates an amount of times that the first portion of the video content was replayed.

* * * * *